(12) United States Patent
Lim et al.

(10) Patent No.: US 12,341,190 B2
(45) Date of Patent: Jun. 24, 2025

(54) COATED SINGLE CRYSTALLINE METAL OXIDE MATERIALS AND METHOD FOR PRODUCING THE SAME

(71) Applicant: Action Battery Technologies, Inc., Dallas, TX (US)

(72) Inventors: Jin-Myoung Lim, Coppell, TX (US); Benjamin Cape Jacobs, Dallas, TX (US); Rodney Dwagne C. Alvarez, Little Elm, TX (US); Jose Emilio Frausto-Lopez, Springtown, TX (US)

(73) Assignee: Action Battery Technologies, Inc., Dallas, TX (US)

( * ) Notice: Subject to any disclaimer, the term of this patent is extended or adjusted under 35 U.S.C. 154(b) by 0 days.

(21) Appl. No.: 18/500,262

(22) Filed: Nov. 2, 2023

(65) Prior Publication Data

US 2025/0046794 A1     Feb. 6, 2025

Related U.S. Application Data

(60) Provisional application No. 63/517,759, filed on Aug. 4, 2023.

(51) Int. Cl.
| | |
|---|---|
| *H01M 4/36* | (2006.01) |
| *C02F 1/58* | (2023.01) |
| *H01M 4/02* | (2006.01) |
| *H01M 4/04* | (2006.01) |
| *H01M 4/505* | (2010.01) |

(Continued)

(52) U.S. Cl.
CPC .............. *H01M 4/366* (2013.01); *C02F 1/58* (2013.01); *H01M 4/0402* (2013.01); *H01M 4/505* (2013.01); *H01M 4/525* (2013.01); *H01M 4/583* (2013.01); *H01M 2004/021* (2013.01); *H01M 2004/028* (2013.01)

(58) Field of Classification Search
CPC ...... H01M 3/66; H01M 4/0402; H01M 4/505; H01M 4/525; H01M 4/583; H01M 2004/021; H01M 2004/028
See application file for complete search history.

(56) References Cited

FOREIGN PATENT DOCUMENTS

| CN | 111354926 A | * | 6/2020 | ........ H01M 10/0525 |
|---|---|---|---|---|
| CN | 112786846 A | | 5/2021 | |

(Continued)

OTHER PUBLICATIONS

Google English Machine Translation of CN 111354926, originally published to Cai Chennan on Jun. 30, 2020 (Year: 2020).*

(Continued)

*Primary Examiner* — Niki Bakhtiari
*Assistant Examiner* — Niara Trant
(74) *Attorney, Agent, or Firm* — Baker Botts L.L.P.

(57) ABSTRACT

The present disclosure provides a method for making a coated single crystalline cathode active material. The continuous hydrothermal manufacturing process may include several steps: a) preheating a metal solution, a lithium solution, and a coating solution; b) generating a first mixture by mixing the metal solution and the lithium solution at below a critical point of the first mixture; c) generating a second mixture by mixing the first mixture and the coating solution above a critical point of the second mixture to synthesize the coated single crystalline cathode active material; and d) filtering out the coated single crystalline cathode active material.

20 Claims, 20 Drawing Sheets

(51) Int. Cl.
*H01M 4/525* (2010.01)
*H01M 4/583* (2010.01)

(56) References Cited

FOREIGN PATENT DOCUMENTS

| | | |
|---|---|---|
| CN | 113437260 A | 9/2021 |
| CN | 113036095 B | 1/2023 |
| KR | 10-2410700 B1 | 6/2022 |
| WO | 2023066386 A1 | 4/2023 |

OTHER PUBLICATIONS

Notification of transmittal of the international search report and the written opinion of the international searching authority, of the declaration mailed Nov. 8, 2024, International application No. PCT/US2024/039211, 10 pages.

\* cited by examiner

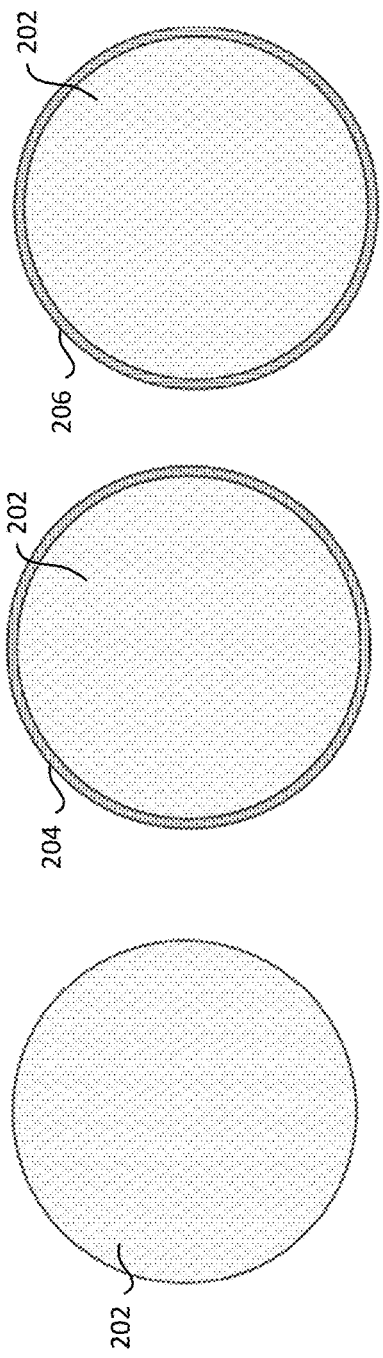
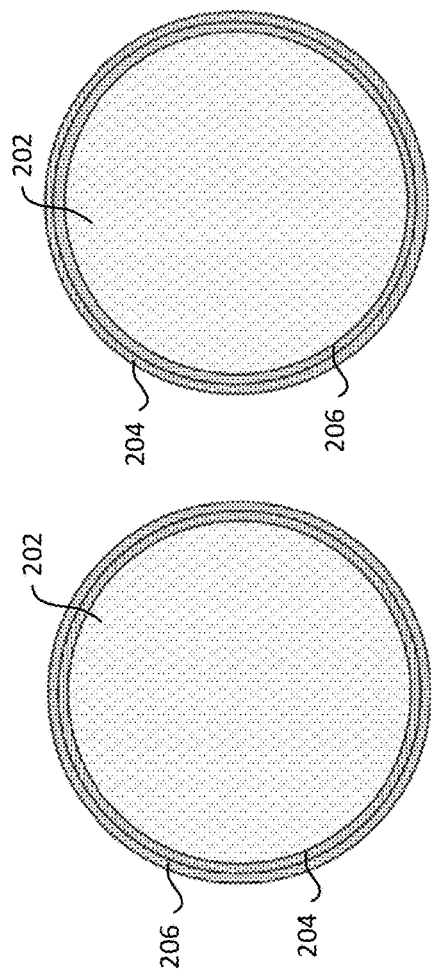
FIG. 2A  FIG. 2B  FIG. 2C  FIG. 2D  FIG. 2E

COATED SINGLE CRYSTALLINE METAL OXIDE MATERIALS AND METHOD FOR PRODUCING THE SAME

BENEFIT CLAIM

This application claims the benefit under 35 U.S.C. § 119 of U.S. Provisional Patent Application No. 63/517,759, filed Aug. 4, 2023, which is incorporated herein by reference.

TECHNICAL FIELD

This disclosure relates to coated single crystalline metal oxide materials, and processes and methods for producing the coated single crystalline metal oxide materials. This disclosure relates to methods and apparatus for making the coated metal oxides. The single crystalline metal oxides may be used in energy storage devices, such as lithium batteries, lithium-ion batteries, lithium metal batteries, lithium sulfur batteries, solid state batteries, sodium batteries, potassium batteries, aluminum batteries, zinc batteries, and flow batteries.

BACKGROUND

The burgeoning markets of electric vehicles, portable consumer electronics, and grid energy storage escalate the demand for safe and renewable energy storage systems with high energy and longer cycle life. Although Li-ion based batteries (LIBs) have been dominant and recognized for their high energy density, increasing demands on issues like electric vehicle range, battery usage lifetimes, and surges in material price have pushed LIB cathode providers to find pathways towards LIB cathode production that may produce high performing material that is also protected to be durable enough to maintain or exceed electrochemical performance expectations at low cost.

Since the cathode material cost takes up to or more than 50% of the battery cell cost, the cost reduction of cathode material is a key factor for LIB adoptions to electric vehicles, grid energy storages, and other applications. The conventional cathode synthesis methods and processes take days of production time in a batch process to result in a large plant footprint and a large capital investment. Thus, the capital investment requirement is one of key factors hampering to produce enough cathode materials to support the rapid increase of battery utilizations. It is crucial to develop a cathode material manufacturing technology that requires a lower capital investment.

As well as the manufacturing cost, raw material cost is also substantial. Among the commercialized cathode active materials, lithium nickel cobalt manganese oxide and lithium nickel cobalt aluminum oxide cathode materials show larger energy density compared to other cathode materials such as lithium iron phosphate cathode materials. However, the raw material costs for nickel and cobalt drive the cathode material cost too high to be widely adopted to the market. It is crucial to develop high energy cathode materials with no or low nickel and cobalt contents without compromising the energy density.

Based on the foregoing, the referenced technical fields have developed an acute need for processes which coat single crystalline cathode materials at low cost, high flexibility, and high yield to meet the challenges of today's battery industries. At the same time, there is a need in the art for processes which produce coated single crystalline cathode materials in a high production continuous method for enabling low cost, high flexibility, and high yield to be competitive in the market.

SUMMARY

In accordance with the above, presently disclosed embodiments are directed to a method and process of producing coated single crystalline metal oxide materials by a continuous hydrothermal method which shows high efficiency, lower material consumption, lower capital investment, and lower operating expenses.

Among the many potential advantages to the methods, apparatus, and systems of the present disclosure, only some of which are alluded to herein, the present disclosure may provide a method and a process to apply the continuous hydrothermal method to produce single crystalline metal oxide particles between tens of nanometers in diameter and tens of micrometers in diameter depending on the reaction time.

In some embodiments, single crystalline metal oxide materials that may be used for lithium battery cathode active materials. In some embodiments, coated single crystalline metal oxide materials by using carbonaceous materials, metal oxide coating materials, and any combination thereof.

In some embodiments, a cathode active material may include a deagglomerated single crystalline particle, a layered lithium nickel manganese oxide material in contact with the deagglomerated single crystalline particle, a metal oxide coating in contact with the layered lithium nickel manganese oxide material, and a carbon coating in contact with the metal oxide coating. In particular, the deagglomerated single crystalline particle includes a stand-alone crystalline particle with no secondary particles or conglomerates. The layered lithium nickel manganese oxide material includes a layered crystal structure and $Li_{1+a}Ni_xMn_{1-x}D_yO_{2+b}$, wherein $0.0<a<0.5$, $0.0<x<=0.9$, $0.0<y<=0.1$, $0.0<b<0.5$, and D is a dopant which includes sodium, potassium, crystal water, aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, and any combination thereof. The metal oxide coating includes an aluminum oxide, a titanium oxide, a cobalt oxide, a nickel oxide, a copper oxide, a silicon oxide, a germanium oxide, a selenium oxide, a zirconium oxide, a niobium oxide, a tungsten oxide, a gallium oxide, a lithium oxide, a magnesium oxide, a strontium oxide, a barium oxide, an iron oxide, a hafnium oxide, a ruthenium oxide, a tantalum oxide, a vanadium oxide, an yttrium oxide, a manganese oxide, and any combination thereof. The metal oxide coating has a thickness of from about 0.1 nanometer (nm) to about 1 micrometer (μm). The carbon coating includes amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof. The metal oxide coating has a thickness of from about 0.1 nm to about 1 μm.

In some embodiments, a method for making a coated single crystalline cathode active material by using a continuous hydrothermal manufacturing process. The method may include several steps. The first step may be to preheat a metal solution, a lithium solution, and a coating solution. The second step may be to generate a first mixture by mixing the metal solution and the lithium solution at below a critical point of the first mixture. The third step is to generate a second mixture by mixing the first mixture and the coating solution at above a critical point of the second mixture to synthesize the coated single crystalline cathode active material. The fourth step is to filter out the coated single crystalline cathode active material. In particular, the coated single crystalline cathode active material includes a deagglomerated single crystalline particle, a layered lithium nickel manganese oxide material in contact with the deagglomerated single crystalline particle, a metal oxide coating in contact with the lithium nickel manganese oxide material, and a carbon coating in contact with the metal oxide coating. The deagglomerated single crystalline particle includes a stand-alone crystalline particle with no secondary particles or conglomerates. The layered lithium nickel manganese oxide material includes a layered crystal structure and $Li_{1+a}Ni_xMn_{1-x}D_yO_{2+b}$, wherein $0.0<a<0.5$, $0.0<x<=0.9$, $0.0<y<=0.1$, $0.0<b<0.5$, and D is a dopant which includes sodium, potassium, crystal water, aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, and any combination thereof.

In some embodiments, the metal oxide coating includes an aluminum oxide, a titanium oxide, a cobalt oxide, a nickel oxide, a copper oxide, a silicon oxide, a germanium oxide, a selenium oxide, a zirconium oxide, a niobium oxide, a tungsten oxide, a gallium oxide, a lithium oxide, a magnesium oxide, a strontium oxide, a barium oxide, an iron oxide, a hafnium oxide, a ruthenium oxide, a tantalum oxide, a vanadium oxide, an yttrium oxide, a manganese oxide, and any combination thereof. The metal oxide coating has a thickness of from about 0.1 nm to about 1 μm. The carbon coating includes amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof. The metal oxide coating has a thickness of from about 0.1 nm to about 1 μm.

In some embodiments, the metal solution is an aqueous solution comprising a metal source selected from the group consisting of a carbonate, a hydroxide, a chloride, an oxide, a fluoride, a sulfate, a nitrate, an acetate, a chloride, and any combination thereof, wherein a metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof.

In some embodiments, the lithium solution is an aqueous solution comprising a lithium source selected from the group consisting of: a carbonate, a hydroxide, a chloride, an oxide, a fluoride, a sulfate, a nitrate, an acetate, a chloride, and any combination thereof. In some embodiments, the lithium solution comprises a sodium compound, a potassium compound, and any combination thereof. The sodium compound is selected from the group consisting of carbonate, hydroxide, chloride, oxide, fluoride, sulfate, nitrate, acetate, and any combination thereof. The potassium compound is selected from the group consisting of carbonate, hydroxide, chloride, oxide, fluoride, sulfate, nitrate, acetate, and any combination thereof.

In some embodiments, the coating solution is an aqueous solution comprising a carbonaceous material selected from the group consisting of amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof.

In some embodiments, the coating solution is an aqueous solution comprising a carbon-containing polymer material selected from the group consisting of: polypyrrole, polyaniline, poly(3,4-ethylenedioxythiophene), polyvinylidene fluoride, polytetrafluoroethylene, polyethylene oxides, ethyl cellulose, nitrocellulose, sucrose, glucose, carboxymethyl cellulose, and any combination thereof.

In some embodiments, the coating solution is an aqueous solution comprising a metal source selected from the group consisting of a carbonate, a hydroxide, a chloride, an oxide, a fluoride, a sulfate, a nitrate, an acetate, a chloride, and any combination thereof, wherein a metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof.

In some embodiments, at least one of the metal solution, the lithium solution, and the coating solution comprise an additive chemical selected from the group consisting of: citric acid, phosphoric acid, acetic acid, oxalic acid, ammonium hydroxide, hydrogen peroxide, sulfuric acid, cholic acid, ethanol, isopropyl alcohol, acetone, acetonitrile, hexane, cyclo-hexane, and any combination thereof.

In some embodiments, a concentration of the metal solution is from about 0.01 molar concentration to about 3 molar concentration, a concentration of the lithium solution is from about 0.01 molar concentration to about 3 molar concentration. A concentration of the coating solution is from about 0.01 molar concentration to about 3 molar concentration.

In some embodiments, the preheating of the metal solution, the lithium solution, and the coating solution may be performed at a temperature between 20° C. and 350° C., and a pressure between 1 bar and 150 bar. The mixing of the metal solution and the lithium solution may be performed at a temperature between 20° C. and 500° C., and a pressure between 1 bar and 250 bar. The mixing of the first mixture and the coating solution may be performed at a temperature between 350° C. and 500° C., and a pressure between 150 bar and 250 bar.

In some embodiments, a system for making a coated single crystalline cathode active material may use a continuous hydrothermal manufacturing process. The system may include an inert gas supply configured to store inert gas to maintain an inert environment within the system. The system further includes a plurality of Continuous Stirred Tank Reactors (CSTRs) configured to store a plurality of reactant solutions (e.g., related to battery production). The plurality of reactant solutions comprise a metal solution, a lithium solution, and a coating solution. The system includes a flow regulation device fluidically coupled to the inert gas supply. The flow regulation device may be configured to moderate a rate of gas flow into the plurality of CSTRs. The system may also include a plurality of pumps and check valves coupled to the plurality of CSTRs. The plurality of pumps and check valves may be configured to regulate transport of the plurality of chemicals under a first pressure. The system may include one or more preheaters fluidically coupled to the plurality of CSTRs and/or the plurality of pumps and check valves. The one or more of preheaters may be configured to elevate a temperature of the plurality of the metal solution, the lithium solution, and the coating solution under a first temperature. The system may include a mixer comprising a plurality of inlet ports and an outlet port. The mixer may be fluidically coupled to the one or more of preheaters and configured to mix the plurality of reactant solutions (e.g., by inducing turbulence and prompting fluid homogenization). The system may include one or more reactors coupled to the mixer to generate reactor effluent by maintaining at least two of the plurality of reactant solutions at a second temperature for a period of time. The reactor effluent may include a coated single crystalline cathode active material. The system further includes a solid-liquid separator component coupled to the one or more reactors. The solid-liquid separator component may be configured to filter out the coated single crystalline cathode active material.

In some embodiments, a method for performing coating in contact with single crystalline metal oxide materials during the continuous hydrothermal process or after the continuous hydrothermal process.

In some embodiments, a method for inserting lithium into single crystalline metal oxide materials during the continuous hydrothermal process, after the continuous hydrothermal process, or both.

In some embodiments, a method for inserting lithium into single crystalline metal oxide materials at subcritical state, or supercritical state, or both.

In some embodiments, a method for inserting lithium into single crystalline metal oxide materials during filtration, drying, heat treatment process, and any combination thereof.

In some embodiments, a method for inserting lithium into single crystalline metal oxide materials through an additional lithium insertion process.

In some embodiments, a method for re-utilizing the remaining lithium in the output flow of the continuous hydrothermal process.

In some embodiments, a method for recycling and recovering the remaining lithium in the output flow of the continuous hydrothermal process.

In some embodiments, a method of heating feed solutions and supercritical water at a high concentration to reduce the amount of heat and energy required to increase temperature.

In some embodiments, a method of heating feed solutions and supercritical water by utilizing diverse water heating technologies.

In some embodiments, a method of heating feed solutions and supercritical water by using industrial waste heats.

In some embodiments, a method of utilizing supercritical, subcritical, and/or hot water from industrial sources.

In some embodiments, a method of adjusting the critical points of feed solutions and supercritical water by utilizing additives.

In some embodiments, a method of synthesizing coated single crystalline cathode active materials.

In some embodiments, a method of coating metal oxides, carbonaceous materials, polymers, but not limited to, and any combination thereof during the cathode active material synthesis process, after the synthesis process, or both.

BRIEF DESCRIPTION OF THE DRAWINGS

In the drawings:

FIGS. 2A, 2B, 2C, 2D, and 2E are schematic diagrams illustrating uncoated and coated single crystalline metal oxide materials, in accordance with aspects of the present disclosure.

Figure 1B:
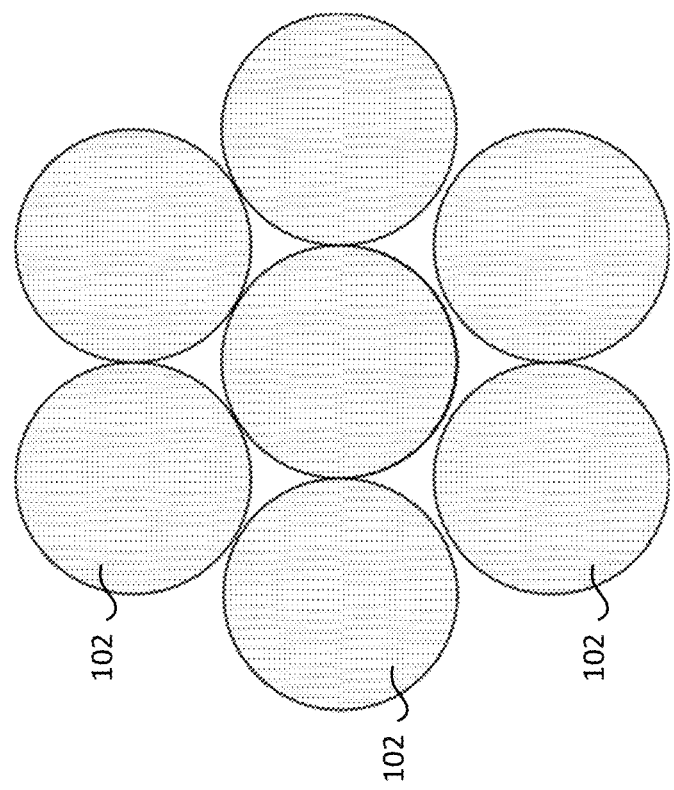
FIGS. 1A and 1B are schematic diagrams illustrating single crystalline metal oxide materials, in accordance with aspects of the present disclosure.

While the present disclosure is amenable to various modifications and alternative forms, specific embodiments are shown by way of example in the drawings and are described in detail. However, the drawings and description are not intended to limit the disclosure to the forms disclosed. The intention is to cover all modifications, equivalents, and alternatives falling within the spirit and scope of the present disclosure as defined by the appended claims.

DESCRIPTION OF EXAMPLE EMBODIMENTS

1. General Overview

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

Illustrative embodiments of the present disclosure are described in detail herein. In the interest of clarity, not all features of an actual implementation are described in this specification. It will of course be appreciated that in the development of any such actual embodiment, numerous implementation-specific decisions must be made to achieve the developers' specific goals, such as compliance with system related and business-related constraints, which will vary from one implementation to another. Moreover, it will be appreciated that such a development effort might be complex and time consuming but would nevertheless be a routine undertaking for those of ordinary skill in the art having the benefit of the present disclosure. Furthermore, in no way should the following examples be read to limit, or define, the scope of the disclosure.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present disclosure in which, for example, functions may be executed out of order from that shown or discussed, including substantially concurrently or in reverse order, depending on the functionality involved.

This disclosure relates generally to a coated single crystalline cathode active material, and processes and methods for generating the coated single crystalline cathode active material. The coated single crystalline cathode active material may be a coated single crystalline metal oxide material generated by a continuous hydrothermal process. The coated single crystalline cathode active material may be used in lithium-ion batteries including lithium cobalt oxide (LiCoO2), lithium manganese oxide (LiMn2O4), lithium iron phosphate (LiFcPO4 or LFP), and lithium nickel manganese cobalt oxide (LiNiMnCoO2 or NMC). In one embodiment, the disclosure provides methods and apparatuses for generating lithium-inserted single crystalline metal oxide materials. In one embodiment, the disclosure provides methods and apparatuses for inserting lithium during and after the continuous hydrothermal process. In one embodiment, the disclosure provides methods and apparatuses for generating a minimized lithium salt amount in an input flow for cost reduction. In one embodiment, the disclosure provides methods and techniques for enhancing the efficiency of lithium use, conserving heat in water-based processes, improving the ability to pump liquids at higher concentrations, and achieving single-crystal structures in a single step. Commercialized cathode active materials, such as incumbent polycrystalline cathode materials, have a fracture challenge after cycles due to heterogeneous volume expansions. The fracture after cycles substantially compromises a cycle life of a battery. Thus, single crystalline cathode materials are necessary to improve the cycle life. To further improve the cycle life of the battery, the surface needs to be protected due to the surface degradation for cathode materials over the cycles. A traditional approach to protect high-performance cathode material is to introduce a coating which may maintain surface durability without inhibiting surface conductivity. However, this coating may need to be uniform, precise, protective, and conductive as to prevent a reduction in electrochemical performance. With the protective coating for cathode materials, a conductive coating is useful to reduce the charge transfer impedance and increase the electrical conductivity which contribute to fast charging and discharging properties. Along with the electrical conductivity on the surface, it is important to secure short lithium diffusion pathways by synthesizing the cathode materials with a diameter small enough. Therefore, the incumbent challenges around the cathode materials may be resolved by developing small coated single crystalline cathode materials with lower cobalt and nickel contents by utilizing a low-cost manufacturing method. In particular, the continuous hydrothermal method may be used to produce single crystalline cathode materials with a low capital investment. For example, the continuous hydrothermal method may use a fast synthesis reaction that has a high production rate contributing to reducing the size of equipment and plant footage, resulting in a lower capital investment. As another example, the continuous hydrothermal method may produce single crystalline metal oxide particles between tens of nanometers in diameter and tens of micrometers in diameter depending on the reaction time. As a result, the continuous hydrothermal method may show high efficiency, lower material consumption, lower capital investment, and lower operating expenses to generate single crystalline metal oxide materials.

2. Coated Single Crystalline Cathode Active Materials

Figure 1A:
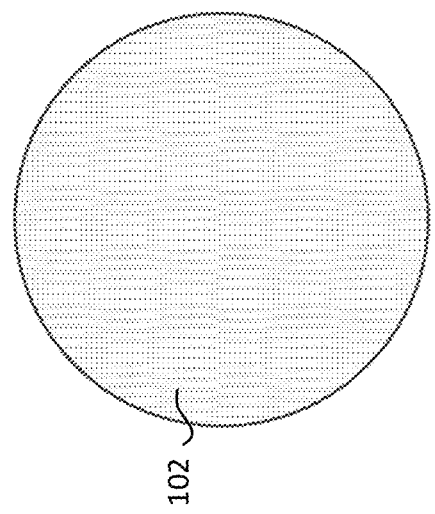

FIGS. 1A and 1B show single crystalline metal oxide materials. In some embodiments, single crystalline metal oxide materials may be used for lithium battery cathode active materials. Cathode active materials are typically composed of metal oxides as main elements dictating the differences in composition while building positive electrodes for battery cells. For example, the cathode materials may include cobalt, nickel and manganese in a crystal structure forming a multi-metal oxide material to which lithium is added. Common cathode materials used in lithium-ion batteries include lithium cobalt oxide, lithium manganese oxide, lithium iron phosphate, and lithium nickel manganese cobalt oxide. The single crystalline materials here may be defined as particles 102 without agglomeration, conglomeration, and aggregation as shown in FIG. 1A as an example. The single crystalline materials may or may not have grain boundaries. Polycrystalline or agglomerated cathode active materials as shown in FIG. 1B as an example suffer from fracture and further cycle life degradation due to interparticle fractures and intraparticle fractures. For this reason, the single crystalline materials fundamentally remove the fracture challenges of cathode active materials, resulting in prolonged cycle life and extended lifetime of lithium batteries.

FIGS. 2A, 2B, 2C, 2D, and 2E show uncoated and coated single crystalline metal oxide materials. FIG. 2A shows a cathode active material substrate 202 for an uncoated single crystalline metal oxide materials. In some embodiments, coatings in contact with single crystalline metal oxide materials include carbonaceous materials and metal oxide materials. The coating may be carbonaceous materials, metal oxide materials, or both materials. Carbonaceous materials may improve electrical conductivity to enhance electron transfer by effectively reducing charge transfer impedances on the surface. FIG. 2B shows the carbonaceous coatings 204 are essential for the cathode active materials with a low conductivity such as lithium iron phosphate. FIG. 2C shows the metal oxide coatings 206 may protect the surface from surface degradation, oxidation, decomposition, and other surface side reactions, resulting in prolonged cycle life and extended lifetime of lithium batteries. For some materials, one of these coatings is necessary, but for other materials, both coatings are necessary to make the lithium batteries commercially competitive. The structure of the coatings may be a factor in determining the properties of coatings. In some cathode materials and lithium battery configurations, it is effective to generate carbonaceous coatings 204 on top of the cathode active material substrate 202 and then metal oxide coatings 206 on top of the carbonaceous coatings 204 as shown in FIG. 2D. In other cases, it is effective to generate metal oxide coatings 206 on top of the cathode active material substrate 202 and then carbonaceous coatings 204 on top of the metal oxide coatings as described in FIG. 2E.

A coating may deagglomerate agglomerated particles to generate single crystalline materials. Single crystalline metal oxide materials with hydrophobic surface may agglomerate in water and have conglomerates after drying or heat treatment processes, resulting in the loss of its single crystalline nature and the associated advantages, which include high tap density, durability, fewer fractures, and reduced crack generation and propagation. The coating may modify the surface property of the single crystalline metal oxide materials and stabilize as a single crystal without agglomeration in water and also after the drying or heat treatment processes.

The coating may be disposed on a surface and may partially or entirely enclose single crystalline metal oxide materials. The coating may be in any suitable shape, such as islands or clusters on the surface of the metal oxide or as a continuous layer. The coating may include one or more of surface doping, where the coating cannibalizes a surface portion of the existing metal oxide, an island and/or cluster coating and/or conformal layer that extends from the surface of the metal oxide. Examples of dopants or doping elements include sodium, potassium, crystal water, aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, and any combination thereof. In some embodiments, the coating may have multiple layers, such surface doping layers, layers that extend from the surface of the metal oxide, and any combination thereof. In some embodiments, the coverage of the coating in contact with the metal oxide surface may range from about 30 to about 100 percent. The coating may have a thickness ranging from about 0.1 nanometer (nm) to about 10 nm. The coating may have a crystal structure or amorphous structure.

The single crystalline metal oxide materials may have a particle size ranging from 50 nm to 100 μm in diameter. The particles may have various shapes of polygons such as trigon, tetragon, pentagon, hexagon, heptagon, octagon, enneagon, decagon, and other polygons with more angles, different shapes of crystals such as rod, bar, cylinder, angled cylinder, rounded cylinder, plane, plate, and other shapes of crystals, and irregular shape of a sphere.

The single crystalline metal oxide materials may be a material suitable as a cathode active material for lithium batteries including lithium-ion battery, lithium metal battery, solid state battery, lithium silicon battery, and other lithium batteries that utilize lithium as a charge carrier. Example metal oxides for use as cathode active materials include a lithium cobalt oxide, a lithium manganese oxide, a lithium nickel oxide, a lithium nickel manganese oxide, a lithium nickel cobalt oxide, a lithium manganese cobalt oxide, a lithium nickel aluminum oxide, a lithium cobalt aluminum oxide, a lithium manganese aluminum oxide, a lithium nickel manganese cobalt oxide, a lithium nickel cobalt aluminum oxide, a lithium nickel manganese aluminum oxide, a lithium nickel cobalt manganese aluminum oxide, a lithium iron phosphate, a lithium manganese phosphate, a lithium iron manganese phosphate, a lithium cobalt phosphate, a lithium iron cobalt phosphate, a lithium iron manganese cobalt phosphate, and any combination thereof. In some embodiments, residual lithium compounds may exist on the surface of above listed cathode materials. For example, residual lithium compounds may include lithium carbonate, lithium hydroxide, lithium chloride, lithium oxide, lithium fluoride, lithium sulfate, lithium nitrate, other forms of lithium-containing chemicals, and any combination thereof. The residual compounds may have a crystal structure, an amorphous structure, and any combination thereof.

Example metal oxides may be a cathode metal oxide precursor with no or small portion of lithium in it to be utilized for synthesizing a cathode material. Metal oxides for use as cathode metal oxide precursors include cobalt oxides, manganese oxides, titanium oxides, nickel oxides, manganese titanium oxides, nickel manganese oxides, nickel cobalt oxides, manganese cobalt oxides, nickel titanium oxides, nickel aluminum oxides, cobalt aluminum oxides, manganese aluminum oxides, nickel manganese cobalt oxides, nickel cobalt aluminum oxides, nickel manganese aluminum oxides, nickel cobalt manganese aluminum oxides, iron phosphate, manganese phosphate, iron manganese phosphate, cobalt phosphate, iron cobalt phosphate, iron manganese cobalt phosphate, aluminum oxides, aluminum hydroxides, and any combination thereof. The cathode metal oxide precursors may include one or more residual lithium compounds as disclosed herein.

Examples of carbonaceous materials include amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof.

Example metal oxide materials include aluminum oxides, titanium oxides, cobalt oxides, nickel oxides, copper oxides, silicon oxides, germanium oxides, selenium oxides, zirconium oxides, niobium oxides, tungsten oxides, gallium oxides, lithium oxides, magnesium oxides, strontium oxides, barium oxides, iron oxides, hafnium oxides, ruthenium oxides, tantalum oxides, vanadium oxides, yttrium oxides, manganese oxides, and any combination thereof.

Coatings may include one of the above coating materials and combinations of two coating materials disclosed herein.

3. Synthesis Methods of Coated Single Crystalline Cathode Active Materials

Figure 3:
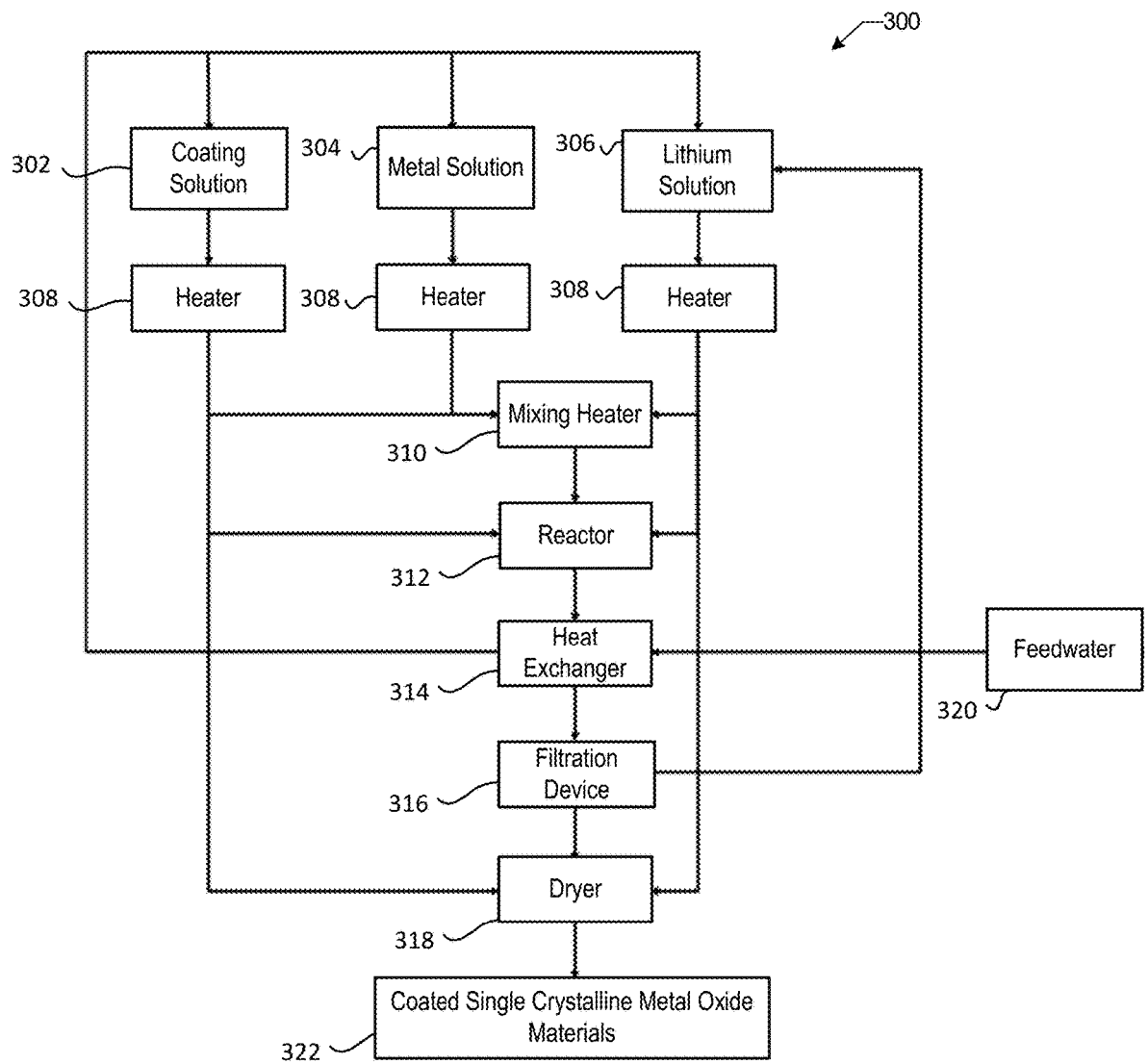
FIG. 3 is an example process flow chart of a synthesis method, in accordance with aspects of the present disclosure.

FIG. 3 shows an example of process flow chart 300 of a synthesis method. A coating solution 302, a metal solution 304, and a lithium solution 306 may be prepared as feed sources. All solutions may be pre-heated using a plurality of heaters 308 in a temperature range between 45° C. and 400° C., and a pressure range between 1 and 300 bar before being injected into a mixing heater 310. The mixing heater 310 has a design to mix all injected solutions homogeneously while heating the mixture solution in a range between 100° C. and 500° C., and a pressure range between 1 and 300 bar. The mixture solution is transferred to reactor 312 for a subcritical, supercritical reaction, and any combination thereof in a range between 100° C. and 500° C., and a pressure range between 1 and 300 bar. After the synthesis reaction at the reactor 312, the reacted solution is transferred to a heat exchanger 314 to both cool down and utilize waste heat. The heat exchanger 314 may receive feedwater 320 preheated using the heat derived from reactor effluent to cool down the reacted solution. Subsequently, coated single crystalline metal oxide materials 322 are filtered out using a filtration device 316 and dried using a dryer 318 in a temperature range between 80° C. and 900° C.

In some embodiments, the coated single crystalline metal oxide materials 322 may be a material suitable as a cathode active material for lithium batteries. For example, the cathode active material may include a deagglomerated single crystalline particle, a layered lithium nickel manganese oxide material in contact with the deagglomerated single crystalline particle, a metal oxide coating, such as metal oxide coatings 206, on top of the layered lithium nickel manganese oxide material, and a carbon coating, such as carbonaceous coatings 204, on top of the metal oxide coating. The deagglomerated single crystalline particle includes a stand-alone crystalline particle with no secondary particles or conglomerates. The layered lithium nickel manganese oxide material includes a layered crystal structure and $Li_{1+a}Ni_xMn_{1-x}D_yO_{2+b}$, wherein $0.0<a<0.5$, $0.0<x<=0.9$, $0.0<y<=0.1$, $0.0<b<0.5$, and D is a dopant. Examples of dopants or doping elements include sodium, potassium, crystal water, aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, and any combination thereof. The metal oxide coating includes an aluminum oxide, a titanium oxide, a cobalt oxide, a nickel oxide, a copper oxide, a silicon oxide, a germanium oxide, a selenium oxide, a zirconium oxide, a niobium oxide, a tungsten oxide, a gallium oxide, a lithium oxide, a magnesium oxide, a strontium oxide, a barium oxide, an iron oxide, a hafnium oxide, a ruthenium oxide, a tantalum oxide, a vanadium oxide, an yttrium oxide, a manganese oxide, and any combination thereof. In particular, the metal oxide coating has a thickness of from about 0.1 nm to about 1 μm. The carbon coating includes amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof. In particular, the carbon coating has a thickness of from about 0.1 nm to about 1 μm.

In some embodiments, the coated single crystalline metal oxide materials 322 may be generated using a continuous hydrothermal manufacturing process including three steps. Firstly, the continuous hydrothermal manufacturing process may preheat the coating solution 302, the metal solution 304, and the lithium solution 306. In particular, the preheating of the coating solution 302, the metal solution 304, and the lithium solution 306 may be performed at a temperature between 20° C. and 350° C., and a pressure between 1 bar and 150 bar. Secondly, the continuous hydrothermal manufacturing process may generate a first mixture by mixing the metal solution 304 and the lithium solution 306 at below a critical point of the first mixture. In particular, the mixing of the metal solution 304 and the lithium solution 306 may be performed at a temperature between 20° C. and 500° C., and a pressure between 1 bar and 250 bar. Thirdly, the continuous hydrothermal manufacturing process may generate a second mixture by mixing the first mixture and the coating solution 302 at above a critical point of the second mixture to synthesize the coated single crystalline metal oxide materials 322. In particular, the mixing of the first mixture and coating solution 302 may be performed at a temperature between 350° C. and 500° C., and a pressure between 150 bar and 250 bar. Subsequently, coated single crystalline metal oxide materials 322 are filtered out using a filtration device 316 and dried using a dryer 318 in a temperature range between 80° C. and 900° C.

In some embodiments, coating solution 302 may be an aqueous solution including one or more coating materials. For carbon coating, coating solution 302 may be an aqueous solution comprising a carbonaceous material selected from the group consisting of: amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof. In another carbon coating example, coating solution 302 may be an aqueous solution comprising a carbon-containing polymer material selected from the group consisting of: polypyrrole, polyaniline, poly(3,4-ethylenedioxythiophene), polyvinylidene fluoride, polytetrafluoroethylene, polyethylene oxides, ethyl cellulose, nitrocellulose, sucrose, glucose, carboxymethyl cellulose, and any combination thereof. For metal oxide coating, coating solution 302 may be an aqueous solution comprising a metal source selected from the group consisting of a carbonate, a hydroxide, a chloride, an oxide, a fluoride, a sulfate, a nitrate, an acetate, a chloride, and any combination thereof. A metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof. The concentration of coating solution 302 may be from about 0.01 molar concentration to about 3 molar concentration.

In some embodiments, metal solution 304 may be an aqueous solution comprising a metal source selected from the group consisting of a carbonate, a hydroxide, a chloride, an oxide, a fluoride, a sulfate, a nitrate, an acetate, a chloride, and any combination thereof. A metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof. A concentration of metal solution 304 may be from about 0.01 molar concentration to about 3 molar concentration.

In some embodiments, lithium solution 306 may be an aqueous solution containing a lithium source from the group consisting of lithium-containing carbonate, hydroxide, chloride, oxide, fluoride, sulfate, nitrate, acetate, chloride, and any combination thereof. Lithium solution 306 may further contain sodium-containing, potassium-containing, or both-containing carbonate, hydroxide, chloride, oxide, fluoride, sulfate, nitrate, acetate, chloride, and any combination thereof. Concentration of lithium solution 306 may be from about 0.01 molar concentration to about 3 molar concentration.

In some embodiments, additional chemicals may be included into one or more of the coating solution 302, metal solution 304, and lithium solution 306. Examples include citric acid, phosphoric acid, acetic acid, oxalic acid, ammonium hydroxide, hydrogen peroxide, sulfuric acid, cholic acid, ethanol, isopropyl alcohol, acetone, acetonitrile, hexane, cyclo-hexane, and any combination thereof. Additional additives including chelating agent, complexing agent, pH controlling agent, critical point controlling agent, conductive additives, catalysts, and other additives may be included in one or more of the coating solution 302, metal solution 304, and lithium solution 306.

Lithium solution 306 may be added to mixing heater 310, reactor 312, heat exchanger 314, dryer 318, and any combination thereof to diversify lithium insertion stages to reduce residual unreacted lithium in the solutions. To reduce and minimize waste lithium, the residual unreacted lithium may be collected from the filtration step and added back to the lithium solution for re-use.

The reactor 312 may be a two-stage or multi-stage reactors that may generate versatile hydrothermal reactions. One example is a single-stage reactor that is in subcritical or supercritical condition. Another example is a two-stage reactor where the first reactor is subcritical and the second reactor is supercritical or vice versa. Another example is a multi-stage reactor where the first reactor is supercritical, the second subcritical, and the third below-subcritical conditions, or other potential combinations.

Figure 16:
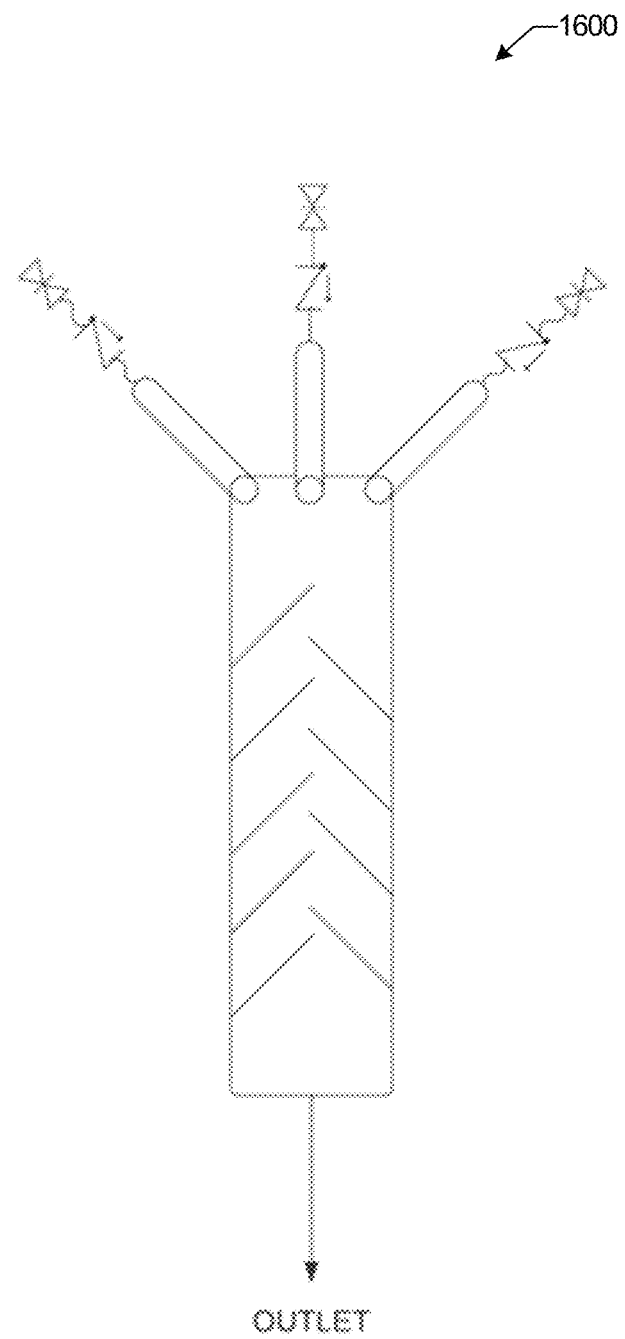
FIG. 16 is an example inline mixer, in accordance with aspects of the present disclosure.

The mixing heater 310 may be an inline mixer 1600 as shown in FIG. 16, equipped with an arbitrary number of inlet ports each connected to an individual input stream, internal mixing elements for inducing turbulence and promoting fluid homogenization, and a dedicated outlet port. The elements may be of diverse types, including, but not limited to, spiral type, screw conveyor type, paddle type, screw type, Tesla type, flat disc type, radial type, axial type, sawtooth blade type, helical blade type, square pitch blade type, hydrofoil blade type, and anchor blade type. Furthermore, these mixing elements may be used individually or in combination, thereby offering a high degree of versatility and adaptability in responding to the specific requirements of the mixing process.

The filtration device 316 may be a mesh filter, a centrifugal filtration, a sieve filtration, a multi-layer mesh filtration, a multi-layer sieve filtration, a multi-junction mesh revolving press filtration, a multi-junction sieve revolving press filtration, a rotary drum filtration, a rotary vacuum drum filtration, a hydro-cyclone separation, a hydro-cyclone filtration, a plate frame filtration, a plate frame press filtration, a sand filtration, a vibrating filtration, a ultrasonic filtration, an in-line separation, an in-line centrifugal separation, an in-line filtration, an in-line centrifugal filtration, and any combination thereof.

In an embodiment, a hydrothermal synthesis may utilize a hydroxide-based precipitation method by utilizing hydroxide sources including sodium hydroxide, potassium hydroxide, and lithium hydroxide, which may be either batch, continuous, or both processes.

In an embodiment, a hydrothermal synthesis may utilize a carbonate-based precipitation method by utilizing carbonate sources including sodium bicarbonate, lithium bicarbonate, and potassium bicarbonate, which may be either batch, continuous, or both processes.

In an embodiment, a hydrothermal synthesis may utilize a complexation method without accompanying precipitation process by using complexing agents including ammonium hydroxide, which may be either batch, continuous, or both processes.

In an embodiment, a hydrothermal synthesis may utilize a subcritical state to generate a metal oxide precursor, followed by post processing of inserting lithium into the metal oxide precursor, which may be either batch, continuous, or both processes.

In an embodiment, a hydrothermal synthesis may utilize a supercritical state to generate lithium metal oxide directly from the hydrothermal process, which may be either batch, continuous, or both processes.

In certain embodiments, a hydrothermal synthesis may utilize subcritical and supercritical states to generate lithium metal oxide sequentially, which may be either batch, continuous, or both processes.

In certain embodiments, a hydrothermal synthesis may involve drying, annealing, or a heat treatment process to further insert lithium into metal oxide and/or lithium metal oxide.

Coating methods includes atomic layer deposition, plasma atomic layer deposition, chemical vapor deposition, pulsed laser deposition, physical vapor deposition, wet chemical method, dry chemical method, wet mixing method, dry mixing method, wet solid-state method, and dry solid-state method.

In some embodiments, coating may be integrated into the synthesis process. Coating solution 302 may be added to mixing heater 310, reactor 312, dryer 318, and any combination thereof to generate various coating structures and morphologies. One example is that the coating solution 302 may be added to the mixing heater 310 so that the coating may be performed at the first stage of the reactor 312. Another example is that the coating solution 302 may be added to the reactor 312 after the first stage and before the second stage to generate a coating between different synthesis reactions. Another example is that the coating solution 302 may be added to the dryer 318 so that the coating may be performed on top of the final single crystalline metal oxide materials. For deposition coating methods such as atomic layer deposition, the coating process may be adopted after dryer step.

Figure 4:
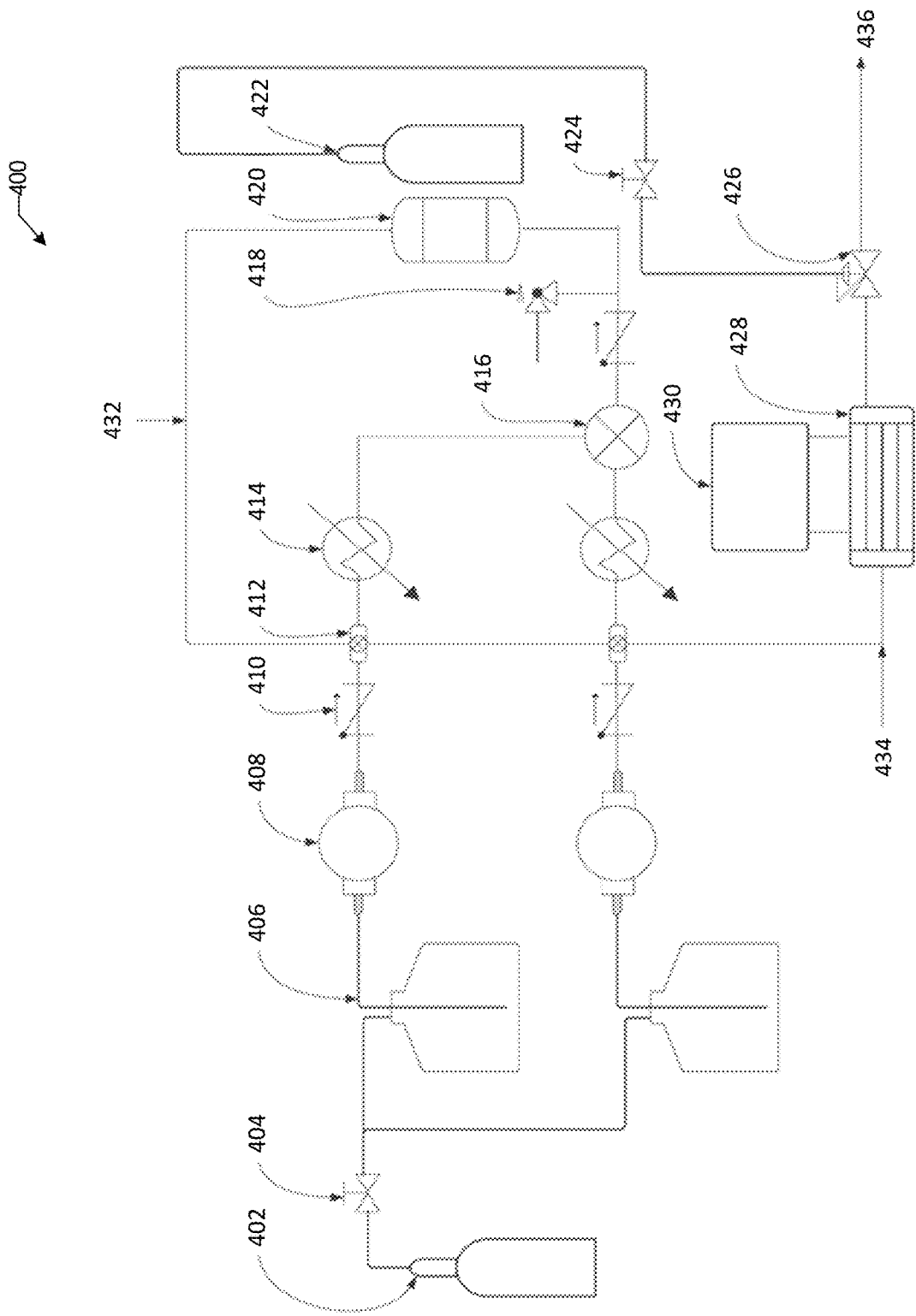
FIG. 4 is a schematic diagram of an example of a continuous hydrothermal process, in accordance with aspects of the present disclosure.

In an embodiment, continuous hydrothermal processes may refer to the drawings, wherein like reference numerals designate identical or corresponding parts throughout the several views, and more particularly to FIG. 4 thereof, the key components of the system 400 are detailed: An inert gas container 402, used for storing inert gas, purposed for maintaining an inert environment within the system 400. A flow regulation device 404, employed to moderate the rate of gas flow into Continuous Stirred Tank Reactors (CSTRs). A plurality of Continuous Stirred Tank Reactors 406, without a fixed quantity or material specification, serving as storage for various chemicals related to battery production. High precision pumps 408, responsible for regulating the transport of chemicals into the system 400 under high pressures ranging from 0.1 bar to 500 bar. The system 400 may incorporate an arbitrary number of pumps, without a fixed material specification. A check valve 410, designed to prevent any undesired backflow towards the pumps. A regenerative heat exchanger 412, tasked with the preheating of feedwater using the heat derived from reactor effluent. A set of preheaters 414, designated to elevate the temperature of the incoming feedwater to a range between 45° C. and 500° C. An inline mixing apparatus 416, equipped with an arbitrary number of inlet ports each connected to an individual input stream, internal mixing elements for inducing turbulence and promoting fluid homogenization, and a dedicated outlet port. A rupture disc 418, installed as a safety feature to protect the reactor vessel from overpressure. A reactor vessel 420, capable of sustaining temperatures between 45° C. and 500° C., and accommodating a variable residence time ranging from 1 second up to 48 hours. A compressed air source 422, serving as the pilot pressure for the back-pressure regulator. A precision regulator 424, used to set the specific pilot pressure. A back-pressure regulator 426, which compares reference pressure to reactor effluent and triggers relief past a certain setpoint. A heat exchanger bundle 428, facilitating the transfer of thermal energy between different fluid streams. A chilling unit 430, integrated within the heat exchanger for temperature control. A designated point for a potential secondary reaction chamber and additional lithium injection 432, aimed at optimizing the reaction and extraction processes. An alternate proposed point for the secondary chamber 434, potentially incorporating a salinity monitoring system and a waste stream diversion mechanism prior to the cooling stage. An output port 436, marking the endpoint of the process and the discharge of the final product.

Figure 20:
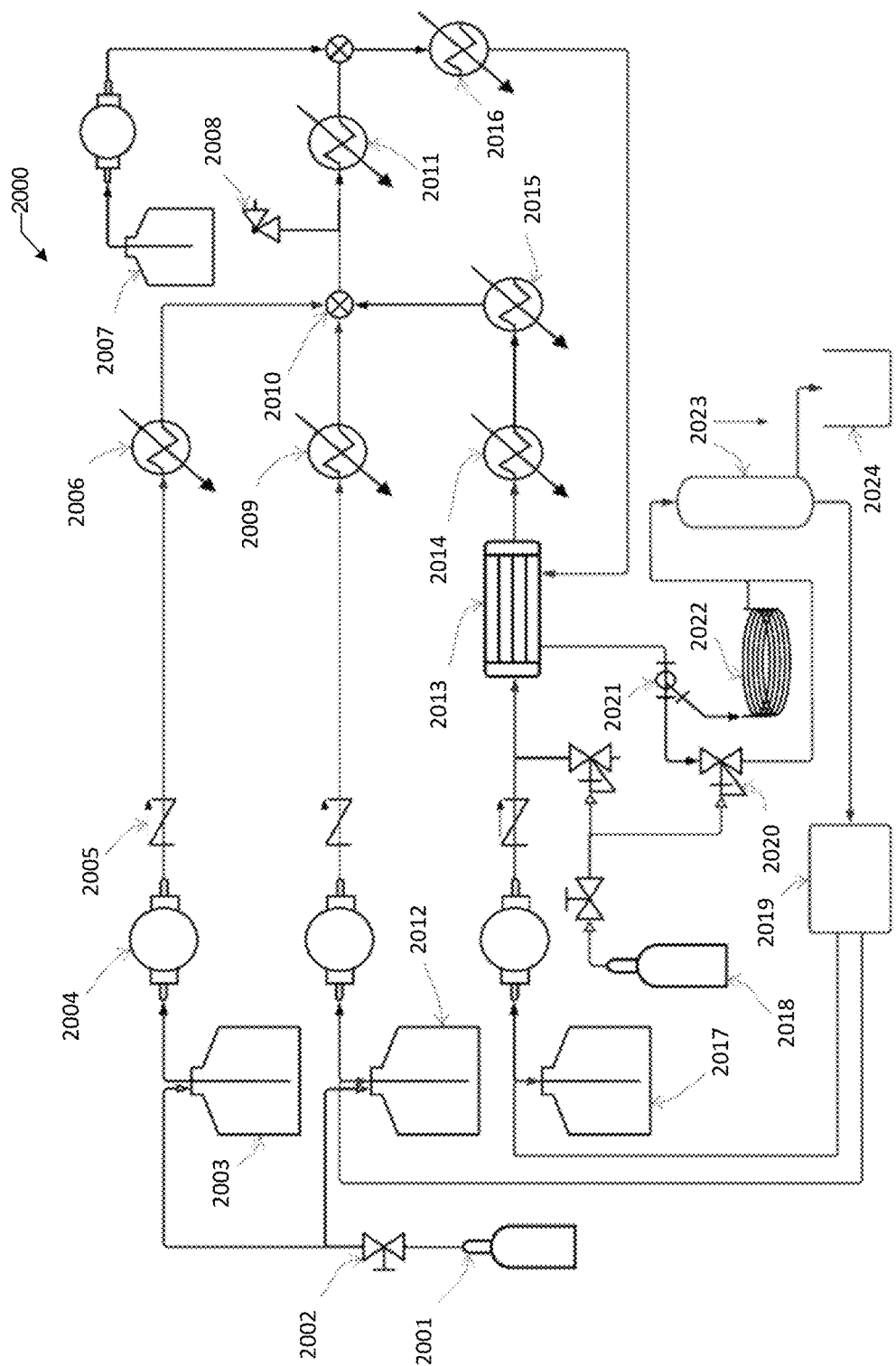
FIG. 20 is a schematic continuous hydrothermal process diagram, in accordance with aspects of the present disclosure.

In another embodiment, continuous hydrothermal processes may refer to the drawings, wherein like reference numerals designate identical or corresponding parts throughout the several views, and more particularly to FIG. 20 thereof, the key components of the system 2000 are detailed: An inert gas supply 2001, used for storing inert gas, purposed for maintaining an inert environment within the system. A valve 2002, employed to moderate the rate of gas flow into CSTRs. A plurality of CSTRs 2003, 2007, 2012, and 2017, without a fixed quantity or material specification, serving as storage for various chemicals related to battery production. Pumps 2004, responsible for regulating the transport of chemicals into the system 2000 under high pressures ranging from 0.1 bar to 500 bar. The system 2000 may incorporate one or more pumps, such as pumps 2004, without a fixed material specification. A check valve 2005, designed to prevent any undesired backflow towards the one or more pumps. A heat exchanger 2013, tasked with the preheating of feedwater using the heat derived from reactor effluent. A set of preheaters 2006, 2009, 2014, and 2015, designated to elevate the temperature of the incoming feedwater to a range between 45° C. and 500° C. A mixer 2010, equipped with an arbitrary number of inlet ports each connected to an individual input stream, internal mixing elements for inducing turbulence and promoting fluid homogenization, and a dedicated outlet port. A relief valve 2008, installed as a safety feature to protect the reactor vessel from overpressure. Reactors 2011 and 2016, capable of sustaining temperatures between 45° C. and 500° C., and accommodating a variable residence time ranging from 1 second up to 48 hours. A compressed air source 2018, serving as the pilot pressure for the back-pressure regulator. A back-pressure regulator 2020, which compares reference pressure to reactor effluent and triggers relief past a certain setpoint. The heat exchanger 2013, facilitating the transfer of thermal energy between different fluid streams. A diverting valve 2021, controlling the flow into either the back-pressure regulator 2020 or a pressure reducer 2022 depending on the operating pressure and operating flow rate. A solid-liquid separation system 2023, separating solid particles from the effluent such as in-line filtration apparatus. A waste water treatment system 2019, purifying the effluent by separating water from concentrated effluent so that purified water and concentrated effluent can be supplied to feed tanks. An output port 2024, marking the endpoint of the process and the discharge of the final product.

The solid-liquid separation system 2023 may be a mesh filter, a centrifugal filtration, a sieve filtration, a multi-layer mesh filtration, a multi-layer sieve filtration, a multi-junction mesh revolving press filtration, a multi-junction sieve revolving press filtration, a rotary drum filtration, a rotary vacuum drum filtration, a hydro-cyclone separation, a hydro-cyclone filtration, a plate frame filtration, a plate frame press filtration, a sand filtration, a vibrating filtration, a ultrasonic filtration, an in-line separation, an in-line centrifugal separation, an in-line filtration, an in-line centrifugal filtration, and any combination thereof.

The waste water treatment system 2019 may include concentrating metal elements and purifying water for re-utilizations. Example techniques include an electro-deionization, a reverse osmosis, an evaporator, an evaporation, an ion exchange material, an ion exchange oxide, an ion exchange resin, an ion exchange membrane, a membrane filter, multi-layer membrane filters, solvent extraction, electrodialysis, precipitation, flocculation, chelation, legation, complexation, direct recycling, and any combination thereof.

4. Lithium Insertion Methods

The technology presented herein encompasses a diverse array of methods for introducing lithium into single crystalline cathode active materials. Each of these methods, whether implemented in isolation or synergistically combined, is designed to optimize the level of lithium insertion. The selection of a particular method, or combination thereof, is dictated by the specific characteristics of the metal oxide involved and the performance requirements of the end product.

In certain embodiments, hydrothermal methods may be utilized to facilitate lithium insertion under high pressure and temperature conditions. This method is well-suited to the synthesis of various nanostructured lithium-containing metal oxides.

Lithium insertion, such as lithium solution 306, may be conducted in mixing heater 310, reactor 312, heat exchanger 314, dryer 318, and any combination thereof to diversify lithium insertion stages to reduce residual unreacted lithium in the solutions. To reduce and minimize waste lithium, the residual unreacted lithium may be collected from the filtration step and added back to the lithium solution for re-use. This method may enable lithium insertion reactions at pre-hydrothermal process at mixing heater 310, at hydrothermal process at reactor 312, and post-hydrothermal processes at heat exchanger 314 and dryer 318. For further diversification of lithium insertion, a method for inserting lithium into single crystalline metal oxide materials through an additional lithium insertion process may be adopted. Example additional lithium insertion process may include annealing, mixing, high energy mixing, milling, high energy milling, heat treatments, calcination, additional drying, and any combination thereof.

The reactor 312 may be a two-stage or multi-stage reactors for effective and efficient hydrothermal reactions. One example is a single-stage reactor that is in subcritical or supercritical condition. Another example is a two-stage reactor where the first reactor is subcritical and the second reactor is supercritical or vice versa. Another example is a multi-stage reactor where the first reactor is supercritical, the second subcritical, and the third below-subcritical conditions, or other potential combinations.

In certain embodiments, ball milling may be employed to increase the surface area of the metal oxide material, promoting effective lithium insertion. Variations in milling duration, rotation speed, types of balls and jars, and ball-to-material ratio may influence the lithium insertion efficiency.

In certain embodiments, electrochemical intercalation may be utilized for controlled lithium insertion. This method ensures precise control over the lithium concentration within the material, enabling customizable electrochemical properties.

A deposition method may be used in some embodiments to deposit a lithium-containing layer onto the metal oxide material. This method provides uniform lithium insertion and excellent control over the lithium distribution. The deposition method includes atomic layer deposition, plasma atomic layer deposition, chemical vapor deposition, pulsed laser deposition, physical vapor deposition.

In some embodiments, an ion exchange process may be utilized for lithium insertion. This process allows the selective insertion of lithium ions, facilitating high lithium content in the metal oxide materials.

For certain embodiments, lithium intercalation from solution may be used, enabling the diffusion of lithium ions into the lattice structure of the metal oxide material.

In certain embodiments, diversified lithium insertion post-hydrothermal process is employed, offering flexibility to introduce lithium ions into the material in a controlled manner, post initial synthesis.

In some embodiments, a two-stage hydrothermal reactor may be utilized for lithium insertion. This process allows for the controlled growth of lithium-containing materials in the first stage and their further transformation in the second stage.

In some embodiments, a method which incorporates lithium into conductive additives may be utilized. The method allows for electrical manipulation of the lithium release rate through manipulation of the conductive additives, thereby controlling its entry into the reaction and enhancing reaction efficiency. Examples conductive additives include carbonaceous materials, polymers, metal oxides, and metal particles. Examples of carbonaceous materials include amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof. Example metal particles include aluminum, titanium, cobalt, nickel, copper, silicon, germanium, selenium, zirconium, niobium, tungsten, gallium, lithium, magnesium, strontium, barium, iron, hafnium, ruthenium, tantalum, vanadium, yttrium, manganese, and other metals. Example metal oxides include aluminum oxides, titanium oxides, cobalt oxides, nickel oxides, copper oxides, silicon oxides, germanium oxides, selenium oxides, zirconium oxides, niobium oxides, tungsten oxides, gallium oxides, lithium oxides, magnesium oxides, strontium oxides, barium oxides, iron oxides, hafnium oxides, ruthenium oxides, tantalum oxides, vanadium oxides, yttrium oxides, manganese oxides, and other metal oxides. Example polymers may include, but are not limited to, polypyrrole, polyaniline, poly(3,4-ethylenedioxythiophene), polyvinylidene fluoride, polytetrafluoroethylene, polyethylene oxides, ethyl cellulose, nitrocellulose, and carboxymethyl cellulose.

In some embodiments, the present disclosure introduces a photo-chemical method that locally increases the reaction temperature and rate, potentially boosting lithium utilization. This technique allows for precise control over local reaction kinetics and overall yield improvement. Example driving force that may facilitate lithium insertion includes a laser, ultraviolet (UV), infra-red, and other light sources.

In some embodiments, the present disclosure utilizes ion exchanger columns to selectively absorb lithium ions. This technique enhances the local concentration of lithium at the reaction site, potentially increasing its utilization and promoting reaction effectiveness.

In some embodiments, the present disclosure utilizes catalyst and additives that improves kinetics and thermodynamics of lithium insertion reaction.

Pre-treatment of lithium sources via grinding may be employed in certain embodiments, enhancing the reactivity of the lithium source for effective lithium insertion.

In certain embodiments, sonication may be used to enhance the reaction on-site and facilitate lithium insertion.

5. Wastewater Treatment 5.1 Recycling of Unreacted Lithium

In one embodiment of the present disclosure, a strategy for the reutilization of unincorporated lithium resulting from a continuous hydrothermal reaction is described. This methodology utilizes a separation mechanism such as but not limited to a gravity-based one to optimize raw material usage, increase economic efficiency, and enhance overall process sustainability.

During the execution of the hydrothermal synthesis, a proportion of lithium may remain unreacted and not incorporated into the metal oxide materials. These unreacted lithium particles, typically diffused in the reactor output's liquid phase, represent a recyclable asset. These particles may be reintroduced into the hydrothermal procedure, improving lithium utilization and decreasing the requirement for supplemental lithium input.

The unreacted residual lithium in the output solution may be analyzed by various spectroscopy techniques and titration techniques to measure the concentrations of lithium and metals being dissolved in the solution. Example techniques include inductively coupled plasma mass spectrometry and inductively coupled plasma optical emission spectroscopy. Example titration techniques include chromatometric, amperometric indication, diazotitration, redox, complexometry, conductometric, thermometric, iodometric, direct measurement, ion selective, ion selective electrode, ion selective membrane, multiple standard addition, potentiometric, precipitation, voltametric indication, single-phase, two-phase, surfactants, photometric, cerimetric, bromatometric, acid/base, arsenometric, and any combination thereof.

A concentration adjustment may be performed before reintroducing the unreacted residual lithium in the solution into the lithium solution feed tank. With this, lithium and metals in the output solution may be recovered and recycled by using lithium and metal extraction techniques. Example lithium metal extraction techniques include ion-exchange oxide materials, ion-exchange membrane, ion-exchange absorbent, direct lithium extraction, direct metal extraction, precipitation, pyrometallurgy, hydrometallurgy, and other extraction methods.

In an aspect of the disclosure, a separator capable of leveraging disparities in particle properties, such as specific gravities, effectively isolates denser lithium particles from less dense components, such as unreacted metal oxides, hydrothermal by-products, and carrier fluids.

In another embodiment, an alternative approach for the recycling of unreacted lithium from the continuous hydrothermal process is described. This strategy hinges on the measurement of ionic content within a waste stream, facilitated by a measuring device such as a salinity cell, which informs the routing of waste material towards appropriate processing trajectories.

The waste stream, a byproduct of the hydrothermal synthesis, may contain a variety of constituents, including unreacted lithium ions dispersed within the carrier fluid. By using a measuring device such as a salinity cell, the ionic content within this waste stream, particularly the lithium-ion concentration, may be determined. This allows for the appropriate routing of the waste stream for subsequent processing.

Waste streams with high lithium-ion concentrations may be directed towards a recovery process. This process could encompass multiple stages such as concentration, purification, and conversion to a form suitable for reintroduction into the hydrothermal reactor inlet. On the other hand, waste streams with low lithium-ion content may be guided towards alternative disposal or treatment methods. Example concentration and purification methods include osmosis, electrophoresis, electroosmosis, reverse osmosis, electrodialysis, electrokinetic methods, and electrochemical methods. Another example techniques include an electro-deionization, a reverse osmosis, an evaporator, an evaporation, an ion exchange material, an ion exchange oxide, an ion exchange resin, an ion exchange membrane, a membrane filter, multi-layer membrane filters, solvent extraction, electrodialysis, precipitation, flocculation, chelation, legation, complexation, direct recycling, and any combination thereof.

6. Water Heating Methods

Supercritical water may be generated by elevating the temperature of water within a sealed system, which may include reactors, pipes, tubes, containers, vessels, chambers, and any combination thereof, starting from room temperature. This heating process occurs under pressure conditions ranging between 0.1 and 500 bar, while maintaining a temperature range of 20° C. to 900° C. The supercritical water heater may be capable of utilizing electric power, gas power, or a combination of both as its energy source. To enhance its heating capabilities, the heating apparatus may employ induction heating as a mechanism, which contributes to its efficient operation. Furthermore, the system may leverage the utilization of intermediate heating oils, enabling higher efficiency in its operations. To maximize energy utilization, the supercritical water heater may be seamlessly integrated with a heat exchanger 314, effectively harnessing waste heat to either maintain or further elevate the temperature of the supercritical water.

In some embodiments, a method of increasing solid contents of the solution to reduce the amount of heat required to increase the temperature of the solution. Since water has a high heat capacity, high concentration feed solutions and high solid contents solution may effectively reduce the energy for heating.

In some embodiments, a method of heating feed solutions, pre-heating feed solutions, and supercritical water by utilizing diverse water heating technologies including natural gas water heaters, electric water heaters, solar water heaters, geothermal water heaters, microwave water heaters, plasma water heaters, heat pump water heaters, nuclear water heaters, and others related water heater technologies.

In some embodiments, a method of heating feed solutions, pre-heating feed solutions, and supercritical water by utilizing renewable and clean energy resources including solar energy, concentrated solar heaters, solar water heaters, geothermal energy, geothermal heaters, wind turbine energy, and any combination thereof.

In some embodiments, a method of heating feed solutions, pre-heating feed solutions, and supercritical water by using industrial waste heat including nuclear power plants, nuclear reactors, coal power plants, steel plants, refineries, geothermal power stations, natural gas combined cycle power plants, and other industrial heat sources.

In some embodiments, a method of utilizing supercritical, subcritical, and/or hot water from industrial sources including nuclear power plants, nuclear reactors, geothermal power stations, coal power plants, steel plants, refineries, natural gas combined cycle power plants, and other industrial hot wastewater sources.

6.1 Regenerative Preheating Using Reactor Effluent

In an embodiment of the present disclosure, a methodology for the efficacious generation of supercritical water involves preheating the introduced feedwater 320. Optimal execution of this process may be accomplished through regenerative preheating, utilizing the reactor effluent or any other suitable high-temperature fluid. This technique seeks to minimize energy expenditure and enhance comprehensive thermal efficiency by recycling the thermal content of the effluent, typically at elevated temperatures.

The reactor effluent, typically at a heightened temperature resultant from the supercritical water reaction conditions, may be channeled through a heat exchanger 314 prior to subsequent processing or discharge. Simultaneously, feedwater 320, introduced at ambient temperature or another comparatively lower temperature, may be also conveyed through the heat exchanger 314, albeit in an opposing direction (counter-flow arrangement) for optimal heat transfer efficiency.

As a result of this counter-current flow within the heat exchanger 314, heat from the high-temperature reactor effluent may be transferred to the incoming feedwater 320. This process raises the temperature of the feedwater 320 before it enters the supercritical water heater, reducing the amount of energy required to achieve supercritical conditions. Simultaneously, the effluent may be cooled before further processing or disposal, contributing to the safety and efficiency of the process.

This regenerative preheating method may be employed in various configurations depending on the specific requirements of the system, including the type of heat exchanger used, the flow rates of the effluent and feedwater, and the desired preheat temperature. It represents a sustainable and cost-effective solution to enhance the overall energy efficiency of the supercritical water production process, contributing significantly to the feasibility and scalability of continuous hydrothermal synthesis of single crystalline metal oxide materials.

In addition to regenerative preheating, the thermal efficiency of the system may be further improved through the use of insulation techniques such as vacuum insulation. This method may entail enclosing the supercritical water heater and the heat exchanger within a vacuum-insulated space or using any other suitable insulation methods to reduce heat loss.

The integration of control systems, which may include smart, automated, or artificial intelligence (AI)-driven systems, in the hydrothermal process may substantially enhance the operational efficiency, safety, and adaptability of the production of single crystalline metal oxide materials. These control systems utilize advanced algorithms, real-time data analysis, or any other suitable techniques to monitor, control, and optimize the various process parameters.

With the ability to regulate the heating and cooling rates, the pressure levels in the reactor, and the flow rates in real time, smart control systems may maintain optimal conditions for the hydrothermal process, enhancing product quality and yield.

Through data analytics and artificial intelligence techniques, smart control systems may identify patterns and trends, enabling predictive maintenance, forecasting system performance, and optimizing energy use. This capability may be particularly beneficial in the regenerative preheating process, where the system could dynamically adjust the flow rates of the feedwater and reactor effluent to maximize heat transfer efficiency. For example, the system may apply an artificial neural network to predict real-time flow rates of the feedwater and reactor effluent based on a plurality of behavior data in the regenerative preheating process, such as pressure, mass flow, and/or temperature. In particular, the system may be configured to include a physics-based model to add a constraint to the artificial neural network to condition the predicted real-time flow rates of the feedwater and reactor effluent. As a result, the system may reasonably predict the real-time flow rates of the feedwater and reactor effluent by solving a least-squares curve fitting problem which has a misfit function which includes a prediction error (e.g., integral square error (ISE), mean error (ME), normalized ISE, and normalized ME) based on the difference between predicted real-time flow rates of the feedwater and reactor effluent obtained using the artificial neural network and acquired real-time flow rates of the feedwater and reactor effluent.

In some embodiments, the disclosure implements a method for preheating water using solar energy, specifically through the use of a parabolic disc. The parabolic disc may be designed to capture and focus solar energy onto a specific point, typically where the water is contained.

The implementation of this method involves positioning the parabolic disc such that it optimally captures incident solar radiation. The disc's shape enables it to concentrate the captured solar energy onto a focal point, effectively transforming solar energy into thermal energy. This focused thermal energy is then used to preheat the water. The supporting assembly for said disc would enable.

In some embodiments, the disclosure considers the potential use of heat pumps for industrial applications, for furthering heat transfer efficiencies within the system.

7. Critical Point Control Methods

In some embodiments, the present disclosure implements a method of adjusting the critical points of feed solutions and supercritical water by utilizing additives including water, carbon dioxide, carbon monoxide, hydrogen, hydrogen peroxide, oxygen, nitrogen, argon, ammonia, nitrous oxide, methane, ethane, ethylene, propane, propene, propylene, n-Butane, isobutane, n-Pentane, benzene, methanol, ethanol, 1-Propanol, 2-Propanol, acetone, acetonitrile, isobutyraldehyde, n-isobutyraldehyde, but not limited to, other solvents and solid additives, and any combination thereof.

In some embodiments, the present disclosure implements a method of modulating the critical point of a water system involves introducing non-electrolyte substances into the system. These substances may alter the critical temperature and pressure of the water, often effecting a decrease of these parameters. The specific impact of these substances may vary depending on their concentration and nature. Suitable non-electrolyte substances may include but not limited to glucose, sucrose, ethanol, or any other suitable non-electrolytic compounds. This method involves determining an appropriate quantity of the selected non-electrolyte, based on the specific requirements and conditions of the process, and then incorporating it into the water system. The use of non-electrolyte substances may allow for precise control over the critical point, enhancing process efficiency and versatility.

In another embodiment, the critical point of the water system may be adjusted through the inclusion of a co-solvent. This approach involves adding a co-solvent with a lower critical point than water, which may result in a reduction of the critical point of the resulting mixture. Co-solvents suitable for this method may include, but are not limited to, methanol, ethanol, acetone, or any other suitable substances. This approach involves determining a suitable quantity of the chosen co-solvent, which is then added to the water system. The use of co-solvents may allow for additional control over the critical point, potentially reducing the energy required for the process and enhancing the overall efficiency of the system.

8. High Concentration Process Design

In some embodiments, the present disclosure presents novel methods and systems designed to optimize the pumping of liquids, particularly at higher concentrations.

In some embodiments, the present disclosure implements a method of heating feed solutions and supercritical water at a high concentration to reduce the amount of heat and energy required to increase temperature.

In some embodiments, the present disclosure implements a design of utilizing gravitation forces to mitigate clogging and sluggish flow due to high concentration feed solutions and high solid content solutions. Example designs include a vertical design, a vertical spiral design, a vertical step/stair design, and any combination thereof.

In some embodiments, the present disclosure implements a design of controlling seeding spots by adjusting and diversifying feed solution injection locations. Examples include one-stage feeding, two-stage feeding, multi-stage feeding, gradual feeding, and any combination thereof. Examples include one-stage seeding, two-stage seeding, multi-stage seeding, gradual seeding, and any combination thereof.

In some embodiments, the present disclosure implements a by-pass water line with a filtration system around the reactor and heating systems so that the high concentration feed solution with lower heat capacity may be achieved to reduce the amount of heat and energy required to increase temperature. An example includes a by-pass water line may be installed before reactor 312 with a filtration so that partial water may be filtered out and high concentration feed solution may be injected to reactor 312, then the partial water in the by-pass water line may be added to heat exchanger 314 as a cooling water and decrease the concentration of the outcome solution from reactor 312 for a smooth transportation to following steps. Another example includes a by-pass water line may be installed on reactor 312 with a filtration so that partial water may be filtered out and high concentration feed solution may be injected to reactor 312, then the partial water in the by-pass water line may be added back to reactor 312 to decrease the concentration of the outcome solution for a smooth transportation to following steps. In this example, the transportations of solutions may not be compromised by the high concentration solutions in a way that low concentration feed solution may be smoothly transferred to reactor 312 and becomes high concentration feed solution after filtering out the partial water through the by-pass water line, resulting in the high concentration feed solution with lower heat capacity may be heated with a lower heat and energy. The filtered partial water may be added back to reactor 312 after hydrothermal reactions to lower the concentration of the outcome solution for a smooth transportation following steps.

Some embodiment of the present disclosure incorporates flow meters strategically located throughout the pumping system. These meters provide real-time quantification of critical parameters, which may include flow rate, output pressure, and suction pressure, among others. The constant monitoring of these parameters facilitates dynamic adjustments to the system, thereby optimizing operational efficiency, minimizing energy usage, and mitigating potential aberrations during high-concentration liquid pumping.

Further, the described system may also integrate salinity monitoring devices, which may be sensors, probes, or other suitable monitoring apparatuses. These devices assess the electrical conductivity of the liquid, a measure that informs the salinity level. Information from this monitoring may be used to identify and track the accumulation of salts or other soluble substances, which could potentially impair the pumping process. Early detection of high salinity levels triggers preemptive maintenance actions, circumventing blockages, scaling, or other detrimental impacts on the system.

Another embodiment of the present disclosure includes the application of anti-fouling coatings to the interior surfaces of the pumping system. These coatings, which may comprise materials such as silicone, fluoropolymers, copper, metal oxide materials, carbonaceous materials, or zinc, serve to mitigate the buildup of deposits on the system surfaces. Consequently, this results in enhanced fluid flow by reducing potential obstructions and preserving the efficiency of the pumping system.

Additionally, in some embodiments, the present disclosure contemplates the use of low-friction coatings to further optimize the pumping process. Such coatings, including but not limited to hydrogels, carbonaceous materials, metal oxide materials, or diamond-like-carbon, reduce the surface friction within the pumping system. This reduction in friction leads to a smoother fluid flow and an overall improvement in pumping efficiency.

Examples of carbonaceous materials include amorphous carbon, carbon black, acetylene black, ketjen black, conductive carbon, polymer carbon residue, conductive graphite, graphite, natural graphite, artificial graphite, expandable graphite, synthetic graphite, a graphite oxide, a graphene oxide, graphene, crumpled graphene, a single graphene layer, at least two graphene layers, at least three graphene layers, a multi-walled carbon nanotube, a single-walled carbon nanotube, carbon fiber, carbon nanofiber, and any combination thereof.

Example metal oxide materials include an aluminum oxide, a titanium oxide, a cobalt oxide, a nickel oxide, a copper oxide, a silicon oxide, a germanium oxide, a selenium oxide, a zirconium oxide, a niobium oxide, a tungsten oxide, a gallium oxide, a lithium oxide, a magnesium oxide, a strontium oxide, a barium oxide, an iron oxide, a hafnium oxide, a ruthenium oxide, a tantalum oxide, a vanadium oxide, an yttrium oxide, a manganese oxide, and any combination thereof.

In yet another embodiment, the present disclosure incorporates the use of agitation techniques to maintain the integrity of the system surfaces. The application of ultrasound waves aids in breaking up particulate accumulations on the system walls, providing a smoother pathway for fluid flow and mitigating potential impediments to the pumping process. The incorporation of sonication not only enhances the system's operational performance but also contributes to prolonging the lifespan of the pumping system. Example agitation techniques include includes vibrating, shaking, rolling, milling, ball-mill, stirring, mixing, ultrasonic, perturbating, air jet, liquid jet, air flow, liquid flow, and other mechanical techniques including a solid transferring mechanism with a screw conveyor, and any combination thereof. An example ball-mill including a rotating reactor with a plurality of balls, wherein the plurality of balls comprises one or more of $ZrO_2$. $TiO_2$, stainless steel, and $Al_2O_3$. An example stirring mechanism including a blade with a shape of screws, screw conveyors, mixing blades, stirring blades, grading blades, tees, rods, bars, a rod with thorns, and any combination thereof. An example an air jet or air flow techniques including a nozzle that injects a gas including air, $N_2$, $O_2$, Ar, and any combination thereof.

In some embodiments, the present disclosure further encompasses the incorporation of multistage injection and inline dilution mechanisms, primarily aimed at enhancing the performance of lithium extraction, but which may also be beneficial for mitigating challenges encountered during adverse pumping operations.

8.1 Piping Enhancements

In some embodiments, optimization commences at the construction stage of the pipe network, where meticulous engineering and design methodologies are implemented. Every conduit or pipeline element incorporated into the system may be designed and fabricated to be as linear and streamlined in a vertical design utilizing gravitational forces as is practicable, considering the physical and operational constraints of the environment. This characteristic linearity ensures an unimpeded, less resistive transit for the fluid from its source to the designated endpoint, effectively promoting laminar flow and reducing viscous losses.

In scenarios where bends are unavoidable due to spatial or system constraints, they are introduced with a keen focus on their impact on fluid dynamics. Specifically, these bends are engineered with an optimal radius, minimizing any sharpness in order to preserve the fluid's momentum and streamline its trajectory through the bend. The implementation of such bends adheres strictly to a predetermined optimum degree. This optimum angle ensures that it is sufficient to redirect the fluid flow but does not disrupt the fluid's kinetic energy, mitigating the potential for turbulence and flow disruption. To further enhance fluid flow, the internal surfaces of the pipes are meticulously fabricated and finished to reduce surface roughness. This reduces the pipe's friction factor, further optimizing the laminar flow conditions, and minimizing energy dissipation associated with fluid flow. These methods are used in conjunction with the aforementioned coating processes to minimize fluid flow friction to the maximum extent possible.

Multistage injection refers to the sequential introduction of reactants or processing aids into the pumping system at various stages of operation. This strategy allows for a controlled and efficient interaction between the reactants, thereby optimizing lithium insertion parameters. Moreover, the multistage injection process may be adjusted in real-time based on system feedback to maintain optimum conditions throughout the operation.

Inline dilution involves the controlled introduction of diluent into the pumping system to regulate the concentration of reactants or processing liquids. This method helps in maintaining a balanced fluid density, which is paramount for the pumping system's performance, especially under adverse operating conditions. Hence, the integration of multistage injection and inline dilution mechanisms enhances the pumping system's overall efficiency, making it robust enough to handle a range of operational conditions and ensuring optimal lithium extraction performance.

9. Seeding Control Methods

Embodiments of the present disclosure are directed to a method for the synthesis of single crystal cathode materials via a hydrothermal process. The method includes the initiation of homogeneous nucleation and the direction of single crystal growth through the introduction of nanoscale 'seed' entities of the single crystal cathode material into an autoclave. These nanoscale 'seed' entities act as a template for the formation of single crystalline structures.

Further embodiments of the present disclosure include a technique for achieving this approach, which involves the deagglomeration of substantial quantities of polycrystalline material, followed by reintroduction into the process. The said reintroduction allows for the growth of particulates in a controlled manner, further facilitating the formation of desired single crystalline structures.

10. Utilization of Used Lithium Battery Cathode Materials

In some embodiments, the present disclosure relates to a method of utilizing used lithium battery cathode active materials. The used lithium battery cathode active materials may be utilized as a black mass or a processed black mass. In some embodiments, the present disclosure relates to a method of recovering the used lithium battery cathode active materials. Also, in some embodiments, the present disclosure relates to a method of converting the used lithium battery cathode active materials to a new cathode active materials comprising a new chemical composition, coating, doping, particle size and morphology, density, powder properties, particle properties, surface properties, electrode properties, and any combination thereof.

The black mass may contain cathode active materials, polymer binder materials, conducting agents, aluminum, copper, graphite, and other plastic and metal packaging materials. The binder materials include polyvinylidene fluoride, polytetrafluoroethylene, and carboxymethyl cellulose. The conducting agents include carbon black, acetylene black, ketjen black, and super P.

The processed black mass may contain cathode active materials after being separated out. The cathode active materials are composed of heavy metal components that may be separated out, as an example method, by using density difference. Another example includes centrifuge, mixing, blade mixer, hydraulic process, sedimentation, precipitation, dissolution, and any combination thereof.

In some embodiments, the cathode active materials may be any materials described above in the present disclosure. In some embodiments, the present disclosure may rejuvenate the used cathode active materials in the black masses as new cathode active materials that may be utilized for new lithium battery cells with a full capacity. The used cathode active materials may be recovered as an original structure or a single crystalline structure. In some embodiments the present disclosure may produce single crystalline cathode active materials by utilizing polycrystalline used cathode active materials.

The processed black mass may be more effective than the black mass due to the low impurities. However, in some embodiments, the hydrothermal processes described in this present disclosure may utilize the black mass with no issue as supercritical water may dissolve binder materials and other materials may be separated out by using a plurality of separation methods. The plurality of separation methods include centrifuge, mixing, blade mixer, hydraulic process, sedimentation, precipitation, dissolution, and any combination thereof.

This method may convert used cathode active materials to high performing single crystalline cathode active materials or coated single crystalline cathode active materials. This conversion would take advantage of the physicochemical properties of supercritical water, which conditions are found in the continuous hydrothermal manufacturing process, to utilize used lithium battery cathode active materials and restructure the materials into new cathode active materials with or without coating in the original morphology or in the single crystalline morphology. Due to the nature of supercritical water, the conversion process may occur rapidly and cost effectively.

In some embodiments, a method to measure the concentration of lithium and metals in the black mass by utilizing by various spectroscopy techniques and titration techniques to measure the concentrations of lithium and metals being dissolved in the solution. Example techniques include inductively coupled plasma mass spectrometry and inductively coupled plasma optical emission spectroscopy. Example titration techniques include chromatometric, amperometric indication, diazotitration, redox, complexometry, conductometric, thermometric, iodometric, direct measurement, ion selective, ion selective electrode, ion selective membrane, multiple standard addition, potentiometric, precipitation, voltametric indication, single-phase, two-phase, surfactants, photometric, cerimetric, bromatometric, acid/base, arsenometric, and any combination thereof.

In some embodiments, a rejuvenation by inserting lithium by using lithium insertion methods described in this present disclosure Section 4 including a hydrothermal method utilizing supercritical state and supercritical water at mixing heater 310 and reactor 312, and post-hydrothermal processes at heat exchanger 314, dryer 318, and additional steps to intercalate lithium ions into the used cathode active materials.

In some embodiments, a method to compensate deficient lithium and metal elements and add new lithium and metal elements to synthesize and produce a targeted new cathode active material with a new chemical composition, coating, doping, particle size and morphology, density, powder properties, particle properties, surface properties, electrode properties, and any combination thereof. An example method includes adding black mass or processed black mass to metal solution feed tank 304, followed by compensating new lithium solution, metal solution, and coating solution to the feed solution tanks 306, 304, and 302 in order to produce targeted cathode active materials with the desired properties.

11. Other Approaches

11.1 Electrochemical Assisted Hydrothermal Synthesis for Enhanced Single Crystalline Growth In some embodiments, the present disclosure relates to a method of electrochemical-assisted hydrothermal synthesis that promotes single crystal growth and reduces mitigates the formations of polycrystalline structures.

The method encompasses the process of incorporating an electric field during the hydrothermal synthesis process. This unique technique assists in driving the ionic movement and atomic alignment within the synthesis medium.

A direct or alternating current electric field may be introduced during the hydrothermal synthesis. The strength of the field may be adjusted based off desired level of ionic movement and atomic alignment. The application of said electric field causes ions within the synthesis medium to move and align in a specific manner. The exact field strength may be determined experimentally depending on the properties of the crystalline structures produced.

11.2 Magnetic Field Assisted Hydrothermal Synthesis for Enhanced Single Crystalline Growth In some embodiments, the present disclosure relates to a method of electrochemical-assisted hydrothermal synthesis that promotes single crystal growth and reduces mitigates the formations of polycrystalline structures.

A steady or oscillating magnetic field may be established during the hydrothermal synthesis process. The strength of the magnetic field may be modulated based on the required level of magnetic moment alignment and atom coordination. The implementation of the magnetic field induces specific magnetic moments and atom alignments within the synthesis medium. The movement and alignment of these magnetic moments and atoms are regulated by the magnetic field, which may be adjusted to achieve the desired crystal structure. The precise field strength may be experimentally determined depending on the specific types of crystals being synthesized.

11.3 Deagglomeration Assisted by Hydrodynamic Cavitation

In some embodiments, the present disclosure relates to a method of deagglomeration of nanoparticles control and promote formation of uniform single crystalline structures by method of hydrodynamic cavitation, in which small, localized pressure differences create cavitation bubbles creating small intense shock waves to breakdown nanoparticles. These cavitation events induce sufficient physical agitation to achieve said effect.

The method encompasses the process of high velocity flow at any point within the continuous process. This unique technique assists in creating cavitation bubbles by method of high velocity flow through constrictions, nozzles, or other flow-restricting geometries. Flow rate through any constrictions would control the cavitation.

Additional embodiments such as hydraulic cavitation may be utilized to generate cavitation bubbles via methods such as piston compression, pump compression, and any combination thereof, attached inline between processes to induce physical agitation. Strength and speed of hydraulic compression may be controlled to increase and decrease cavitation.

In additional embodiments, high speed rotation may be utilized to generate nucleation sites via methods such as rotating impeller, propeller, discs, and any combination thereof. Alternatively, ultrasonic processes may be utilized in conjunction with any aforementioned method or in combination thereof. These methods further promote the requisite bubbles to perform said physical agitation.

In additional embodiments, ultrasonication, ultrasonic agitation, ultra sound agitation, sonication may generate cavitation bubbles.

12. Examples

The present disclosure will be described in further detail with reference to examples. However, it is to be understood that these examples are illustrative only and the scope of the present disclosure is not limited thereto. Although the preferred embodiment of the present disclosure has been described for illustrative purposes, those skilled in the art will appreciate that various modifications, additions and substitutions are possible, without departing from the scope and spirit of the present disclosure.

Figure 5:
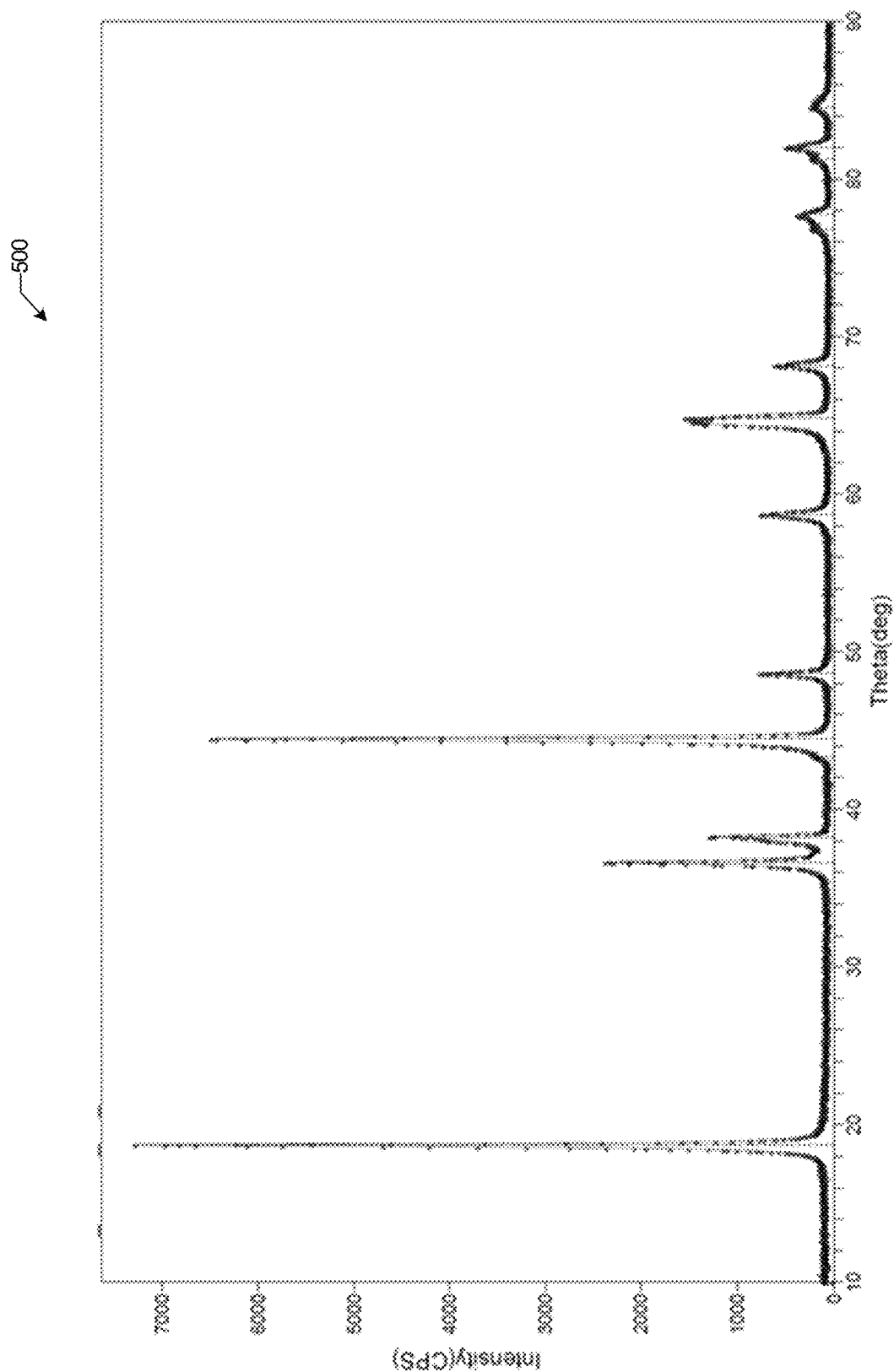
FIG. 5 is an example of X-ray diffraction pattern of single crystalline lithium nickel cobalt manganese oxide cathode material ($LiNi_{0.8}Co_{0.1}Mn_{0.1}O_2$) synthesized by a hydrothermal process, in accordance with aspects of the present disclosure.

A lithium nickel cobalt manganese oxide ($LiNi_{0.8}Co_{0.1}Mn_{0.1}O_2$): 0.8 mole of nickel acetate tetrahydrate, 0.1 mole of cobalt acetate tetrahydrate, and 0.1 mole of manganese acetate tetrahydrate may be dissolved in de-ionized water. 0.5 mole of sodium hydroxide and 0.5 mole of ammonium hydroxide may be added to the metal solution. The mixed solution may be transferred to a reactor under a temperature of 350° C., and pressure of 180 bar. Solid powders may be collected and dried after filtration of the solution, followed by mixing and being heated at 700° C. for 6 hours with 1.0 mole of lithium hydroxide. FIG. 5 shows an example of X-ray diffraction pattern 500 of single crystalline lithium nickel cobalt manganese oxide cathode material ($LiNi_{0.8}Co_{0.1}Mn_{0.1}O_2$) synthesized by a hydrothermal process. In particular, FIG. 5 shows crystal structure of the synthesized $LiNi_{0.8}Co_{0.1}Mn_{0.1}O_2$ in a layered structure R-3m crystal group.

Figure 6:
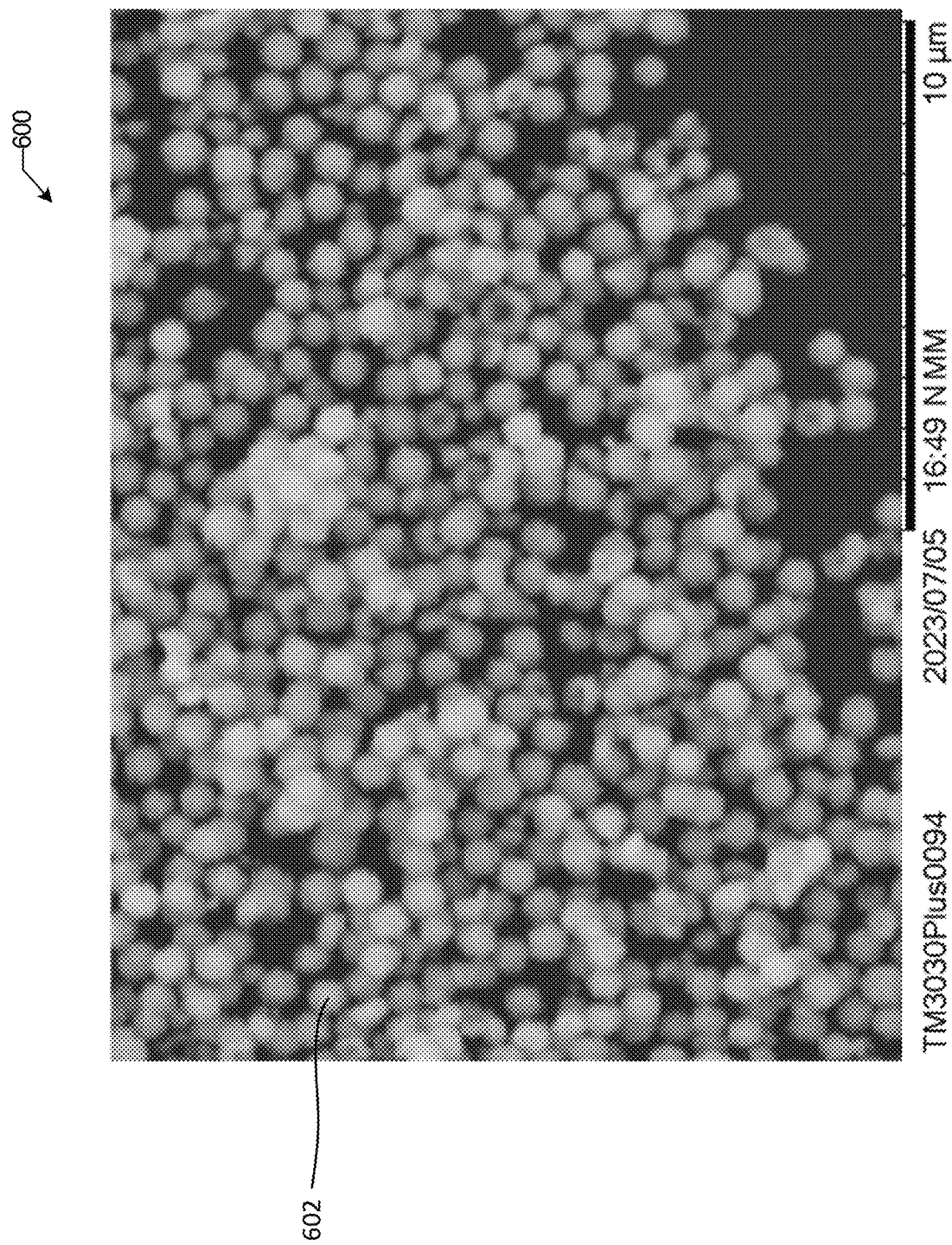
FIG. 6 is an example of scanning electron microscope image of single crystalline nickel cobalt manganese oxide ($Ni_{0.8}Co_{0.1}Mn_{0.1}O_2$) synthesized by a hydrothermal process, in accordance with aspects of the present disclosure.
Figure 7:
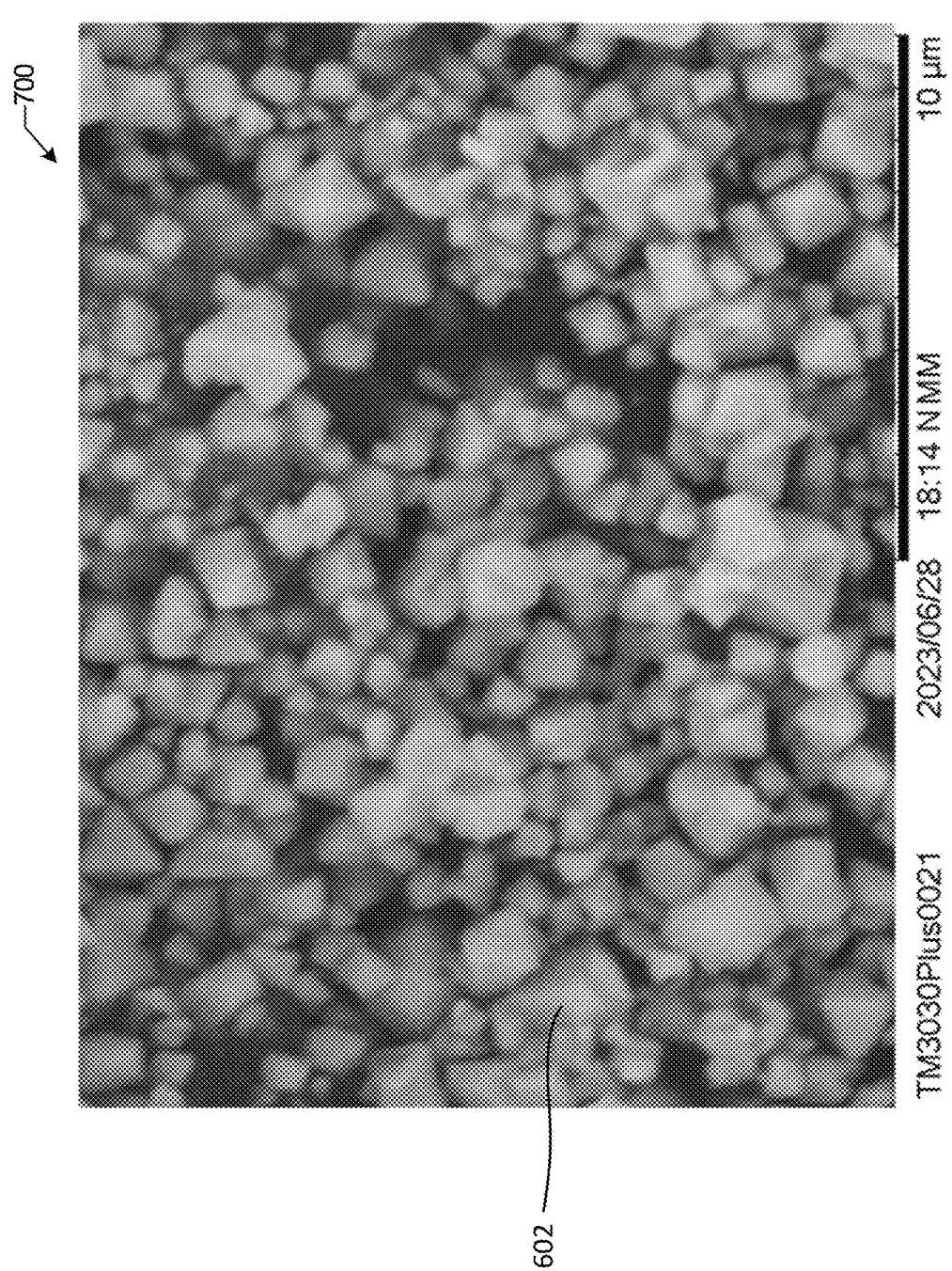
FIG. 7 is an example of scanning electron microscope image of single crystalline lithium nickel cobalt manganese oxide cathode material ($LiNi_{0.8}Co_{0.1}Mn_{0.1}O_2$) synthesized by a hydrothermal process, in accordance with aspects of the present disclosure.
Figures 8A, 8B:
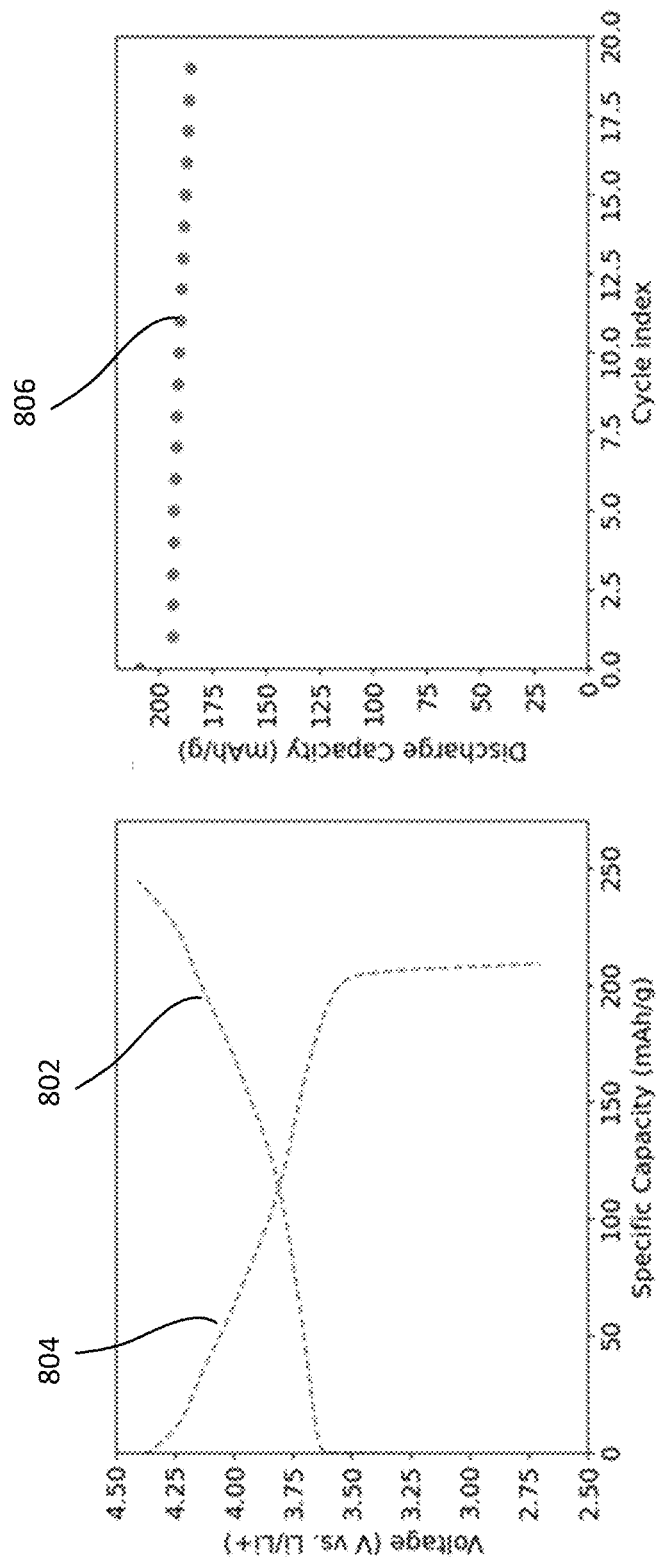
FIGS. 8A and 8B are example performance of charge-discharge profile at the first cycle at 0.1 C (20 mAh/g) and subsequent cycle performance at 1 C (200 mA/g) of single crystalline lithium nickel cobalt manganese oxide cathode material ($LiNi_{0.8}Co_{0.1}Mn_{0.1}O_2$) synthesized by a hydrothermal process, in accordance with aspects of the present disclosure.

FIG. 6 shows an example of scanning electron microscope image 600 of single crystalline nickel cobalt manganese oxide ($Ni_{0.8}Co_{0.1}Mn_{0.1}O_2$) synthesized by a hydrothermal process. FIG. 7 shows an example of scanning electron microscope image 700 of single crystalline lithium nickel cobalt manganese oxide cathode material ($LiNi_{0.8}Co_{0.1}Mn_{0.1}O_2$) synthesized by a hydrothermal process. FIGS. 8A and 8B show example performance of charge-discharge profile at the first cycle and subsequent cycle performance at 1° C. (200 mA/g) of single crystalline lithium nickel cobalt manganese oxide cathode material ($LiNi_{0.8}Co_{0.1}Mn_{0.1}O_2$) synthesized by a hydrothermal process. In FIGS. 6 and 7, it is clear to observe particle size and morphology of $Ni_{0.8}Co_{0.1}Mn_{0.1}O_2$ and $LiNi_{0.8}CO_{0.1}Mn_{0.1}O_2$ for a plurality of single crystalline particles 602. FIG. 8A shows a charging curve 802 and a discharging curve 804 for the single crystalline lithium nickel cobalt manganese oxide cathode material ($LiNi_{0.8}Co_{0.1}Mn_{0.1}O_2$) synthesized by the hydrothermal process. The charging curve 802 and discharging curve 804 may be used to identify different phase changes involved in the charging and discharging processes as well as the associated specific capacities. FIG. 8B shows a change of discharge capacity 806 at the first 20 cycles for the single crystalline lithium nickel cobalt manganese oxide cathode material ($LiNi_{0.8}Co_{0.1}Mn_{0.1}O_2$) synthesized by the hydrothermal process.

Figure 9:
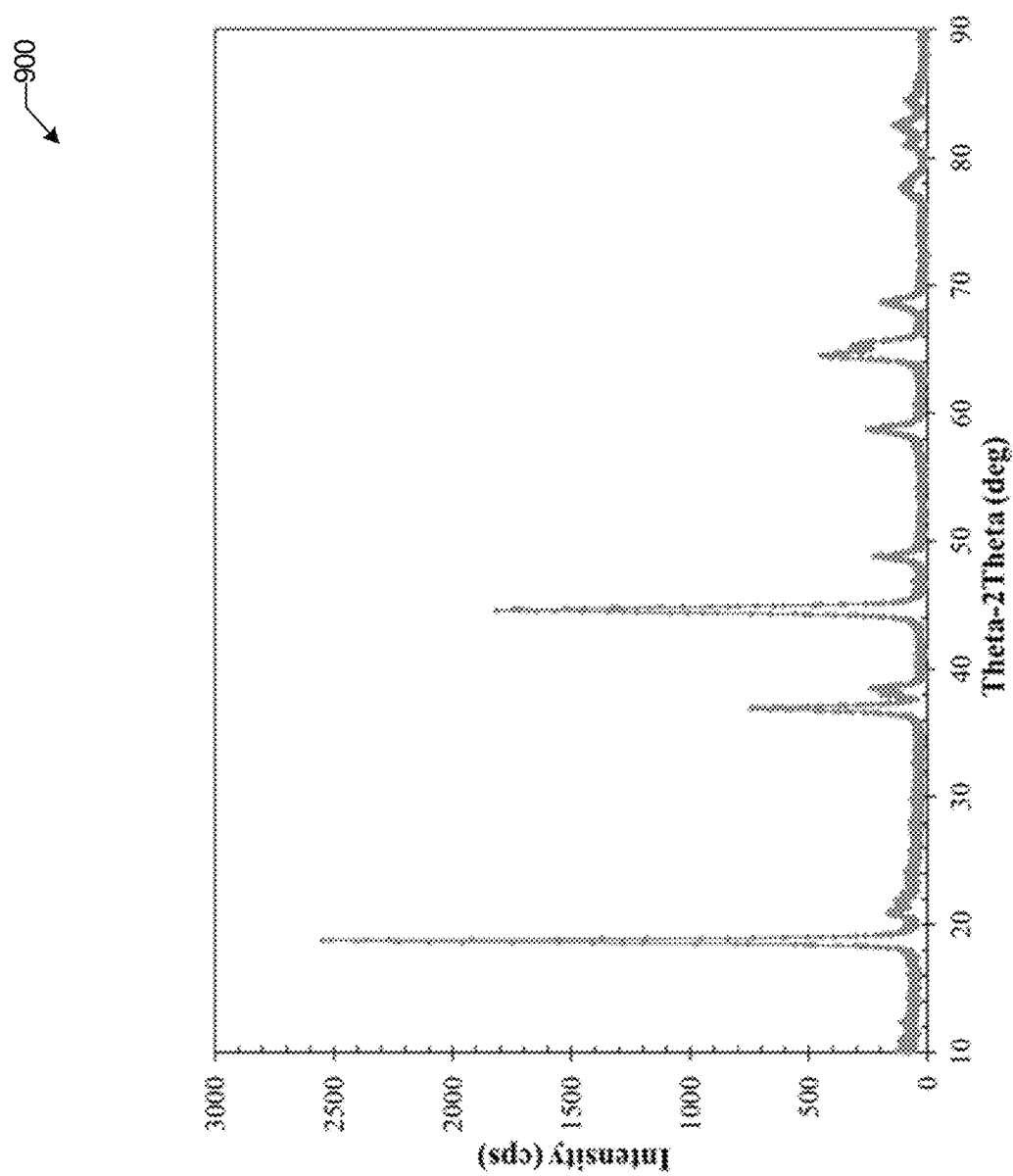
FIG. 9 is an example X-ray diffraction pattern of single crystalline lithium nickel cobalt manganese oxide cathode material ($Li_{1.3}Ni_{0.2}Co_{0.2}Mn_{0.6}O_{2.3}$) synthesized by a hydrothermal process, in accordance with aspects of the present disclosure.

A Lithium Nickel Cobalt Manganese Oxide ($Li_{1.3}Ni_{0.2}Co_{0.2}Mn_{0.6}O_{2.3}$): 0.2 mole of nickel acetate tetrahydrate, 0.2 mole of cobalt acetate tetrahydrate, and 0.6 mole of manganese acetate tetrahydrate may be dissolved in de-ionized water. 0.7 mole of sodium hydroxide and 0.3 mole of ammonium hydroxide may be added to the metal solution. The mixed solution may be transferred to a reactor under a temperature of 350° C., and pressure of 180 bar. Solid powders may be collected and dried after filtration of the solution, followed by mixing and being heated at 900° C. for 6 hours with 1.3 mole of lithium hydroxide. FIG. 9 shows an example of X-ray diffraction pattern 900 of single crystalline lithium nickel cobalt manganese oxide cathode material ($Li_{1.3}Ni_{0.2}Co_{0.2}Mn_{0.6}O_{2.3}$) synthesized by a hydrothermal process. In particular, FIG. 9 shows crystal structure of the synthesized $Li_{1.3}Ni_{0.2}Co_{0.2}Mn_{0.6}O_{2.3}$ in a layered structure R-3m crystal group with superstructure peaks for lithium rich phase.

Figure 10:
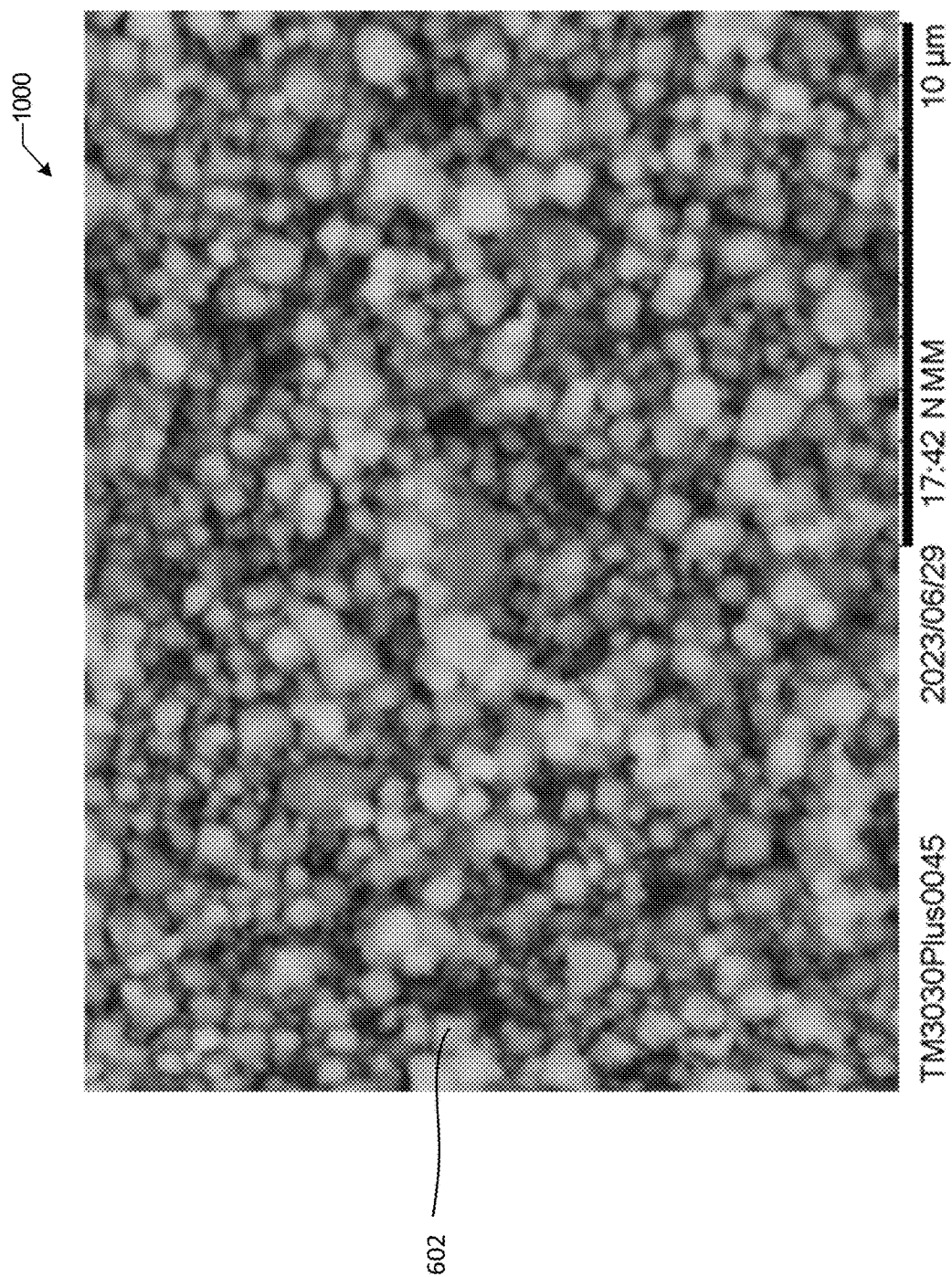
FIG. 10 is an example scanning electron microscope image of single crystalline nickel cobalt manganese oxide ($Ni_{0.2}Co_{0.2}Mn_{0.6}O_2$) synthesized by a hydrothermal process, in accordance with aspects of the present disclosure.
Figure 11:
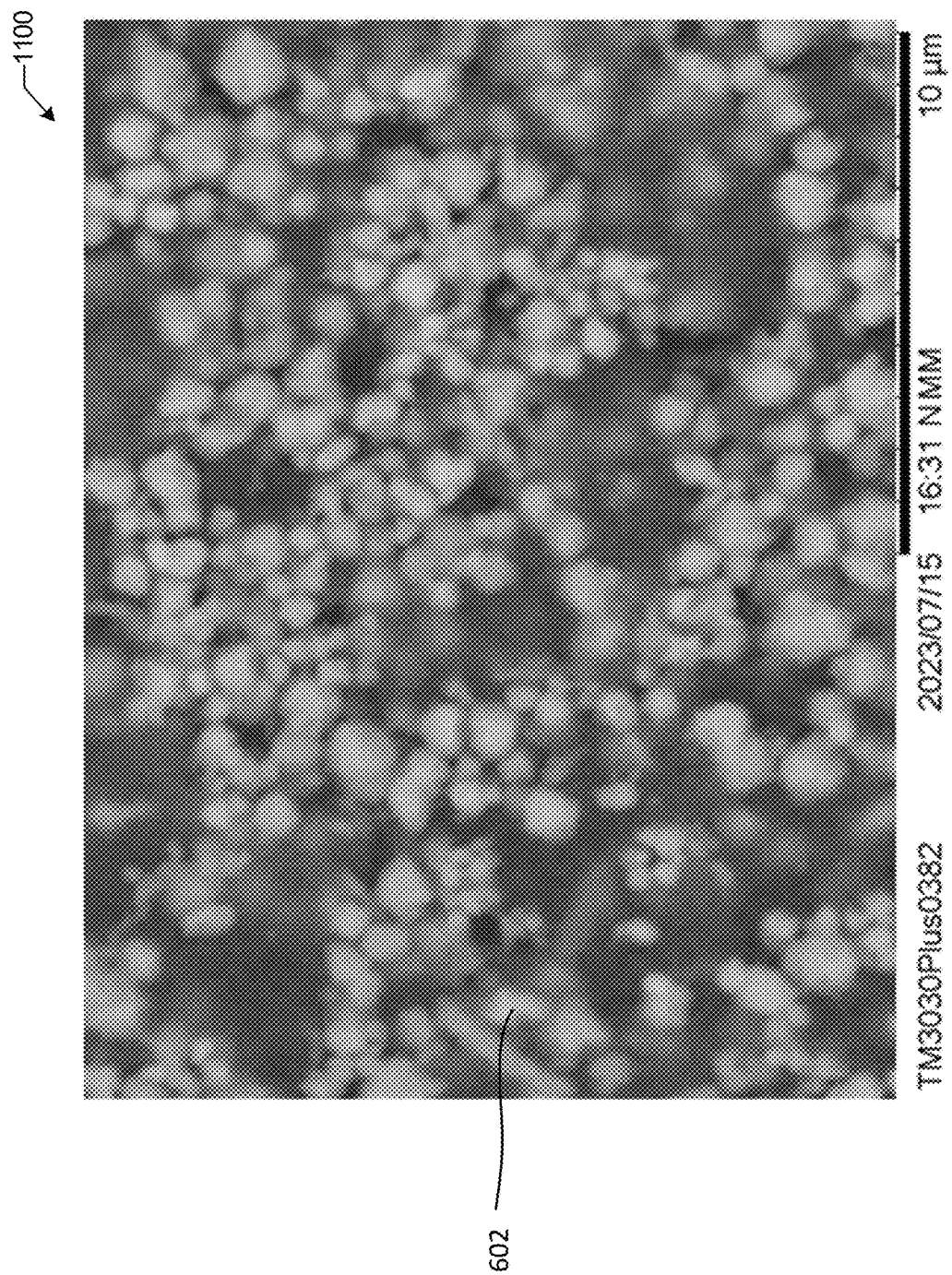
FIG. 11 is an example scanning electron microscope image of single crystalline lithium nickel cobalt manganese oxide cathode material ($Li_{1.3}Ni_{0.2}Co_{0.2}Mn_{0.6}O_{2.3}$) synthesized by a hydrothermal process, in accordance with aspects of the present disclosure.

FIG. 10 shows an example of scanning electron microscope image 1000 of single crystalline nickel cobalt manganese oxide ($Ni_{0.2}Co_{0.2}Mn_{0.6}O_2$) synthesized by a hydrothermal process. FIG. 11 shows an example of scanning electron microscope image 1100 of single crystalline lithium nickel cobalt manganese oxide cathode material ($Li_{1.3}Ni_{0.2}Co_{0.2}Mn_{0.6}O_{2.3}$) synthesized by a hydrothermal process. In FIGS. 10 and 11, it is clear to observe particle size and morphology of $Ni_{0.2}Co_{0.2}Mn_{0.6}O_2$ and $Li_{1.3}Ni_{0.2}Co_{0.2}Mn_{0.6}O_{2.3}$ for a plurality of single crystalline particles 602.

Figure 12:
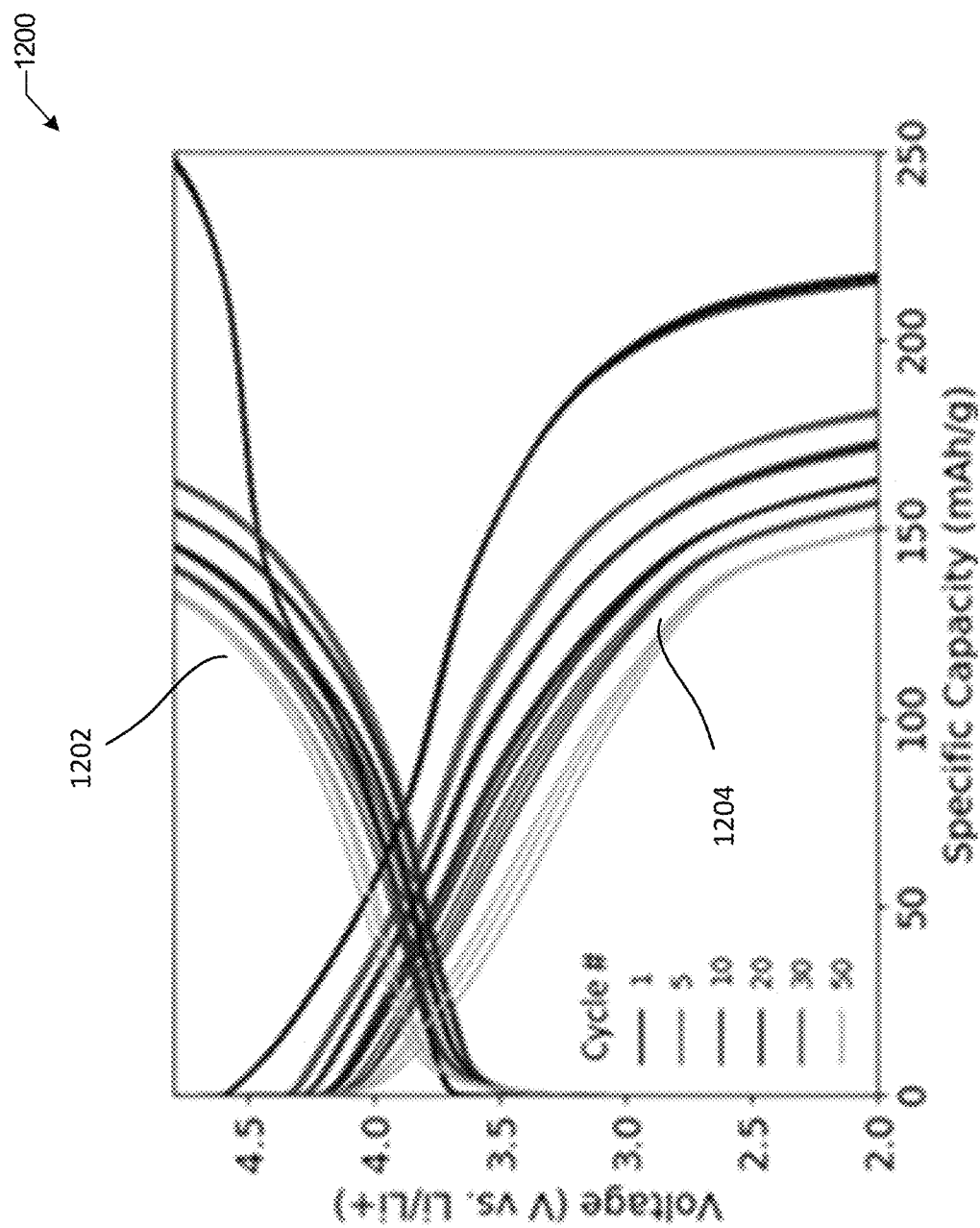
FIG. 12 is an example performance of charge-discharge profiles of single crystalline lithium nickel cobalt manganese oxide cathode material ($Li_{1.3}Ni_{0.2}Co_{0.2}Mn_{0.6}O_{2.3}$) synthesized by a hydrothermal process at different cycle numbers, in accordance with aspects of the present disclosure.

FIG. 12 shows an example performance of charge-discharge profiles 1200 of single crystalline lithium nickel cobalt manganese oxide cathode material ($Li_{1.3}Ni_{0.2}Co_{0.2}Mn_{0.6}O_{2.3}$) synthesized by a hydrothermal process at different cycle numbers. In particular, FIG. 12 shows a plurality of charging curves 1202 and a plurality of discharging curves 1204 at a range of cycles from 1 to 50 for the single crystalline lithium nickel cobalt manganese oxide cathode material ($Li_{1.3}Ni_{0.2}Co_{0.2}Mn_{0.6}O_{2.3}$) synthesized by the hydrothermal process.

A Lithium Nickel Manganese Oxide ($Li_{1.3}Ni_{0.3}Mn_{0.7}O_{2.3}$): 0.3 mole of nickel acetate tetrahydrate and 0.7 mole of manganese acetate tetrahydrate may be dissolved in de-ionized water. 0.9 mole of sodium hydroxide and 0.1 mole of ammonium hydroxide may be added to the metal solution. The mixed solution may be transferred to a reactor under a temperature of 350° C., and pressure of 180 bar. Solid powders may be collected and dried after filtration of the solution, followed by mixing and being heated at 900° C. for 6 hours with 1.3 mole of lithium hydroxide.

Figure 14:
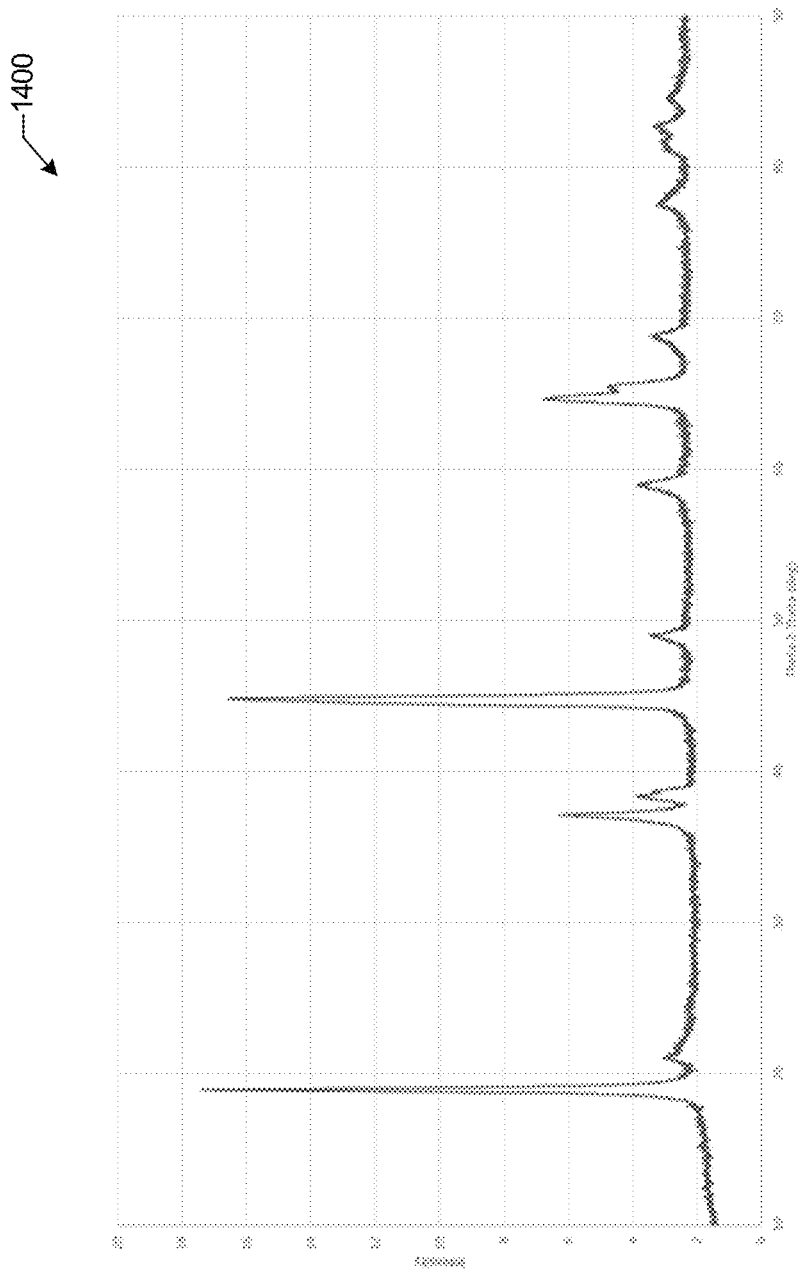
FIG. 14 is an example X-ray diffraction pattern of single crystalline lithium nickel manganese oxide cathode material ($Li_{1.3}Ni_{0.3}Mn_{0.7}O_{2.3}$) synthesized by a hydrothermal process, in accordance with aspects of the present disclosure.

FIG. 14 shows an example of X-ray diffraction pattern 1400 of single crystalline lithium nickel manganese oxide cathode material ($Li_{1.3}Ni_{0.3}Mn_{0.7}O_{2.3}$) synthesized by a hydrothermal process. In particular, FIG. 14 shows crystal structure of the synthesized $Li_{1.3}Ni_{0.3}Mn_{0.7}O_{2.3}$ in a layered structure R-3m crystal group with superstructure peaks for lithium rich phase.

Figure 15:
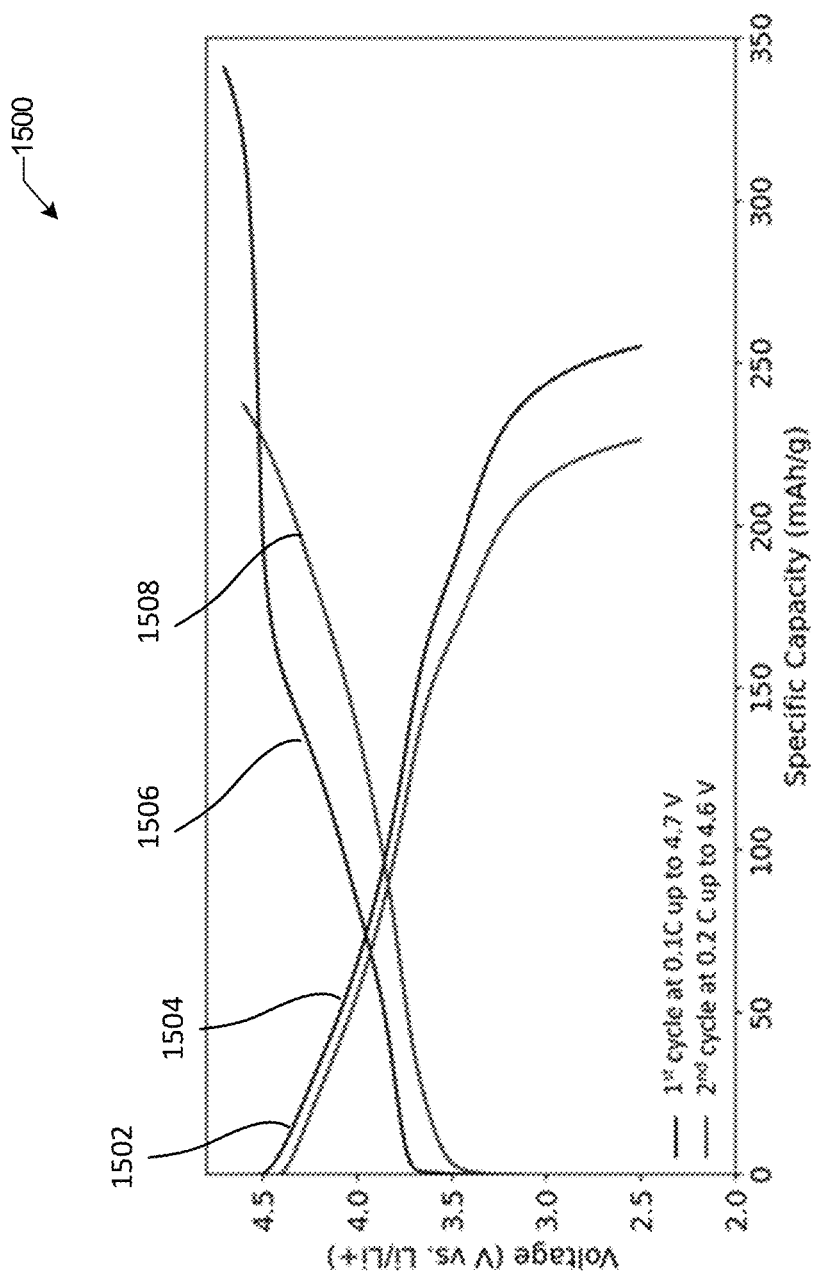
FIG. 15 is an example performance of charge-discharge profiles of single crystalline lithium nickel manganese oxide cathode material ($Li_{1.3}Ni_{0.3}Mn_{0.7}O_{2.3}$) synthesized by a hydrothermal process at the first and second cycles, in accordance with aspects of the present disclosure.

FIG. 15 shows an example performance of charge-discharge profiles 1500 of single crystalline lithium nickel manganese oxide cathode material ($Li_{1.3}Ni_{0.3}Mn_{0.7}O_{2.3}$) synthesized by a hydrothermal process at the first and second cycles. FIG. 15 shows a charging curve 1502 at the first cycle, a charging curve 1504 at the second circle, a discharging curve 1506 at the first cycle, a discharging curve 1508 at the second circle for the single crystalline lithium nickel cobalt manganese oxide cathode material ($Li_{1.3}Ni_{0.2}Co_{0.2}Mn_{0.6}O_{2.3}$) synthesized by the hydrothermal process.

In one example, a lithium iron phosphate ($LiFePO_4$) may be formed using a metal solution including 1.0 mole of iron sulfate and 1.0 mole of phosphoric acid dissolved in de-ionized water. Next, 0.5 mole of sodium hydroxide and 0.5 mole of ammonium hydroxide may be added to the metal solution. The mixed solution may be transferred to a reactor under a temperature of 350° C., and pressure of 180 bar. Solid powders may be collected and dried after filtration of the solution, followed by mixing and being heated at 650° C. for 6 hours with 1.0 mole of lithium hydroxide.

In one example, a lithium iron manganese phosphate ($LiFe_{0.5}Mn_{0.5}PO_4$) may be formed using a metal solution including 0.5 mole of iron sulfate, 0.5 mole of manganese sulfate and 1.0 mole of phosphoric acid dissolved in de-ionized water. Next, 0.5 mole of sodium hydroxide and 0.5 mole of ammonium hydroxide may be added to the metal solution. The mixed solution may be transferred to a reactor under a temperature of 350° C., and pressure of 180 bar. Solid powders may be collected and dried after filtration of the solution, followed by mixing and being heated at 650° C. for 6 hours with 1.0 mole of lithium hydroxide.

In one example, a lithium nickel cobalt manganese oxide ($LiNi_{0.8}Co_{0.1}Mn_{0.1}O_2$) may be formed using a metal solution including 0.8 mole of nickel acetate tetrahydrate, 0.1 mole of cobalt acetate tetrahydrate, 0.1 mole of manganese acetate tetrahydrate dissolved in de-ionized water. Next, 3.0 mole of lithium hydroxide and 0.5 mole of ammonium hydroxide may be added to the metal solution. The mixed solution may be transferred to a reactor under a temperature of 380° C., and pressure of 230 bar. Solid powders may be collected and dried after filtration of the solution, followed by a heat treatment at 450° C. for 1 hour.

Figure 17:
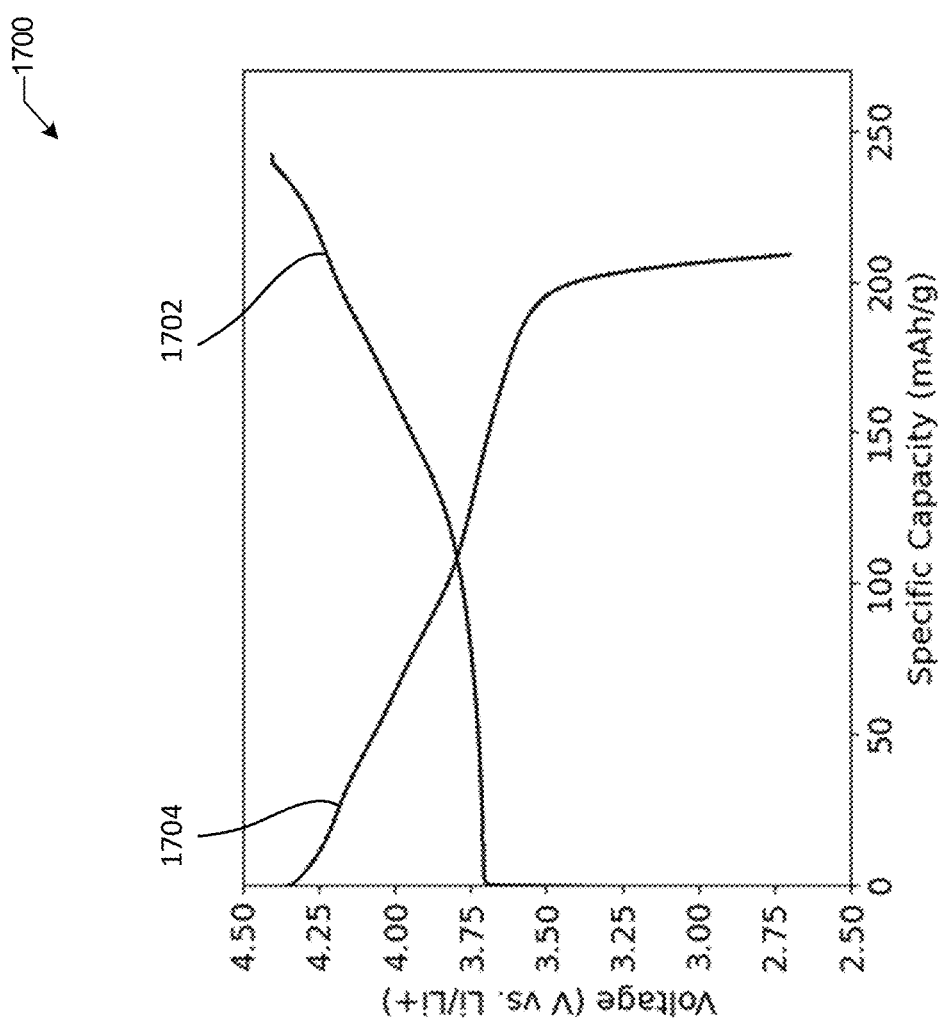
FIG. 17 is an example performance of charge-discharge profile at the first cycle at 0.1 C (20 mA/g) of carbon-coated single crystalline lithium nickel cobalt manganese oxide cathode material ($LiNi_{0.8}Co_{0.1}Mn_{0.1}O_2$) synthesized by a hydrothermal process, in accordance with aspects of the present disclosure.

In one example, a carbon-coated lithium nickel cobalt manganese oxide ($LiNi_{0.8}Co_{0.1}Mn_{0.1}O_2$) may be formed using a metal solution including 0.8 mole of nickel acetate tetrahydrate, 0.1 mole of cobalt acetate tetrahydrate, 0.1 mole of manganese acetate tetrahydrate dissolved in de-ionized water. Next, 3.0 mole of lithium hydroxide and 0.5 mole of ammonium hydroxide may be added to the metal solution. 1 wt % of glucose solution may be added to the mixture solution. The mixed solution may be transferred to a reactor under a temperature of 380° C., and pressure of 230 bar. Solid powders may be collected and dried after filtration of the solution, followed by a heat treatment at 550° C. for 1 hour. FIG. 17 shows example performance of charge-discharge profile 1700, such as charge profile 1702 and discharge profile 1704, at the first cycle at 0.1 C (20 mA/g) of carbon-coated single crystalline lithium nickel cobalt manganese oxide cathode material ($LiNi_{0.8}Co_{0.1}Mn_{0.1}O_2$) synthesized by the hydrothermal process.

Figure 18:
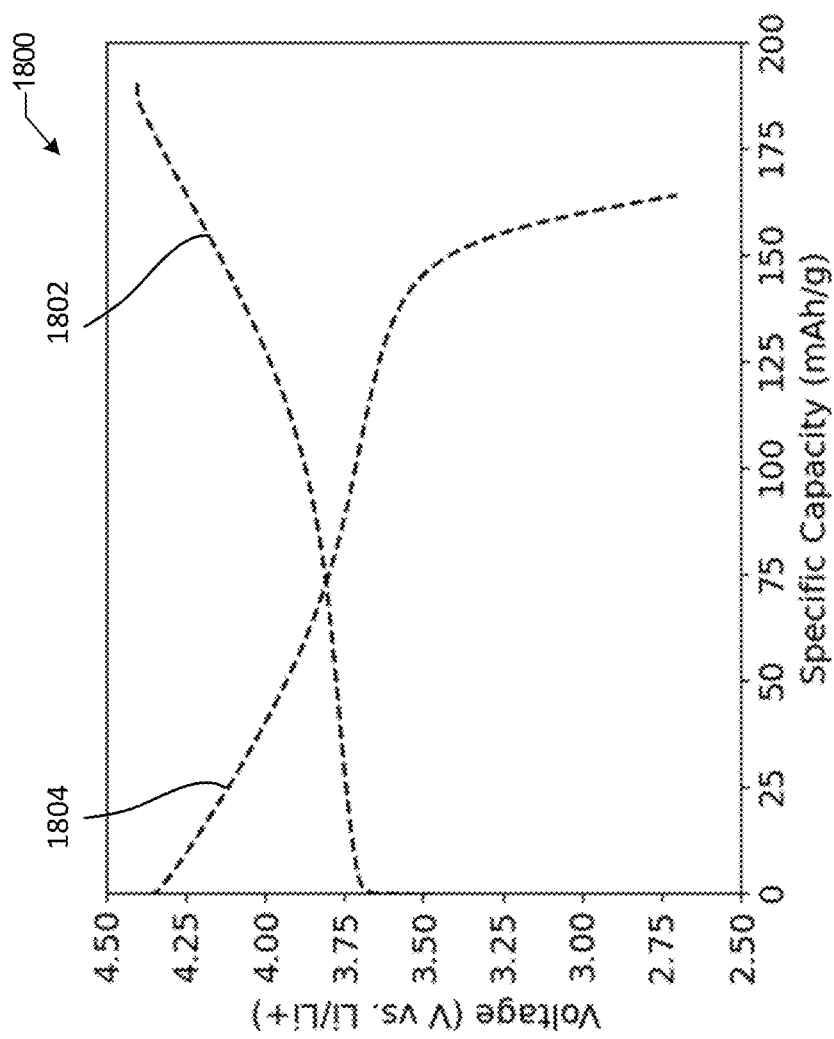
FIG. 18 is an example performance of charge-discharge profile at the first cycle at 0.1 C (20 mA/g) of single crystalline lithium nickel cobalt manganese oxide cathode material ($LiNi_{0.33}Co_{0.33}Mn_{0.33}O_2$) synthesized by a hydrothermal process, in accordance with aspects of the present disclosure.

In one example, a lithium nickel cobalt manganese oxide ($LiNi_{0.33}Co_{0.33}Mn_{0.33}O_2$) may be formed using a metal solution including 0.33 mole of nickel nitrate, 0.33 mole of cobalt nitrate, 0.33 mole of manganese nitrate dissolved in de-ionized water. Next, 3.0 mole of lithium hydroxide may be added to the metal solution. The mixed solution may be transferred to a reactor under a temperature of 380° C., and pressure of 230 bar. Solid powders may be collected and dried after filtration of the solution, followed by a heat treatment at 450° C. for 1 hour. FIG. 18 shows example performance of charge-discharge profile 1800, such as charge profile 1802 and discharge profile 1804, at the first cycle at 0.1 C (20 mA/g) of single crystalline lithium nickel cobalt manganese oxide cathode material ($LiNi_{0.33}Co_{0.33}Mn_{0.33}O_2$) synthesized by the continuous hydrothermal process.

Figure 19:
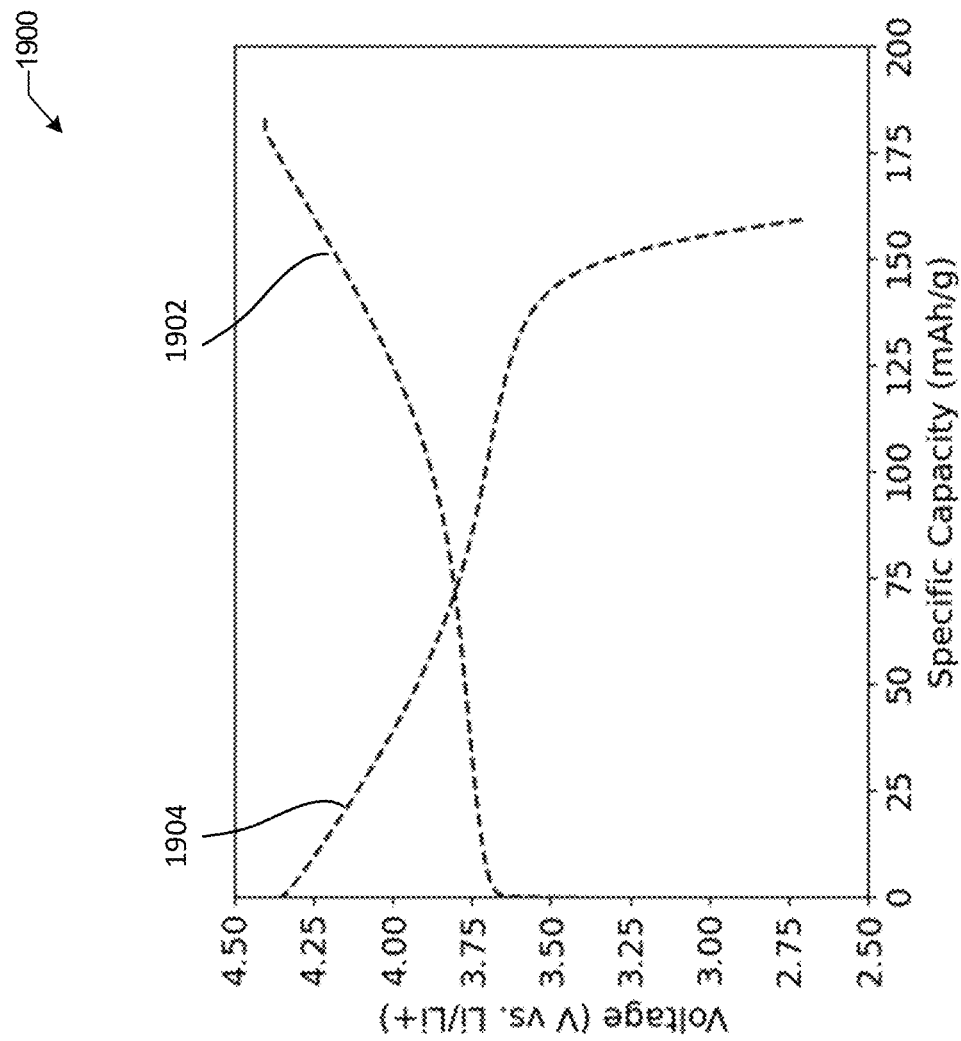
FIG. 19 is an example performance of charge-discharge profile at the first cycle at 0.1 C (20 mA/g) of carbon-coated $Al_2O_3$-coated single crystalline lithium nickel cobalt manganese oxide cathode material ($LiNi_{0.33}Co_{0.33}Mn_{0.33}O_2$) synthesized by a hydrothermal process, in accordance with aspects of the present disclosure.

In one example, a carbon-coated metal-oxide-coated lithium nickel cobalt manganese oxide ($LiNi_{0.33}Co_{0.33}Mn_{0.33}O_2$) may be formed using a metal solution including 0.33 mole of nickel nitrate, 0.33 mole of cobalt nitrate, and 0.33 mole of manganese nitrate dissolved in de-ionized water. Next, 3.0 mole of lithium hydroxide may be added to the metal solution. 1 wt % of sucrose solution and 0.01 mole of aluminum nitrate solution may be added to the mixture solution. The mixed solution may be transferred to a reactor under a temperature of 380° C., and pressure of 230 bar. Solid powders may be collected and dried after filtration of the solution, followed by a heat treatment at 450° C. for 1 hour. FIG. 19 shows example performance of charge-discharge profile 1900, such as charge profile 1902 and discharge profile 1904, at the first cycle at 0.1 C (20 mA/g) of carbon-coated $Al_2O_3$-coated single crystalline lithium nickel cobalt manganese oxide cathode material ($LiNi_{0.33}Co_{0.33}Mn_{0.33}O_2$) synthesized by the continuous hydrothermal process.

In one example, a lithium nickel cobalt manganese oxide ($Li_{1.3}Ni_{0.2}Co_{0.2}Mn_{0.6}O_{2.3}$) may be formed using a metal solution including 0.2 mole of nickel acetate tetrahydrate, 0.2 mole of cobalt acetate tetrahydrate, and 0.6 mole of manganese acetate tetrahydrate dissolved in de-ionized water. Next, 3.6 mole of lithium hydroxide and 1.0 mole of ammonium hydroxide may be added to the metal solution. The mixed solution was transferred to a reactor under a temperature of 380° C., and pressure of 230 bar. Solid powders may be collected and dried after filtration of the solution, followed by a heat treatment at 450° C. for 1 hour.

In one example, a lithium nickel manganese oxide ($Li_{1.3}Ni_{0.3}Mn_{0.7}O_{2.3}$) may be formed using a metal solution including 0.3 mole of nickel acetate tetrahydrate and 0.7 mole of manganese acetate tetrahydrate dissolved in de-ionized water. Next, 3.6 mole of lithium hydroxide and 1.0 mole of ammonium hydroxide may be added to the metal solution. The mixed solution was transferred to a reactor under a temperature of 380° C., and pressure of 230 bar. Solid powders may be collected and dried after filtration of the solution, followed by a heat treatment at 450° C. for 1 hour.

In one example, lithium iron phosphate ($LiFePO_4$) may be formed using a metal solution including 1.0 mole of iron sulfate and 1.0 mole of phosphoric acid dissolved in de-ionized water. Next 2.0 mole of lithium hydroxide and 0.5 mole of ammonium hydroxide may be added to the metal solution. The mixed solution was transferred to a reactor under a temperature of 380° C., and pressure of 230 bar. Solid powders may be collected and dried after filtration of the solution, followed by a heat treatment at 450° C. for 1 hour.

In one example, a lithium iron manganese phosphate ($LiFe_{0.5}Mn_{0.5}PO_4$) may be formed using a metal solution including 0.5 mole of iron sulfate, 0.5 mole of manganese sulfate and 1.0 mole of phosphoric acid dissolved in de-ionized water. Next, 2.0 mole of lithium hydroxide and 0.5 mole of ammonium hydroxide may be added to the metal solution. The mixed solution was transferred to a reactor under a temperature of 380° C., and pressure of 230 bar. Solid powders may be collected and dried after filtration of the solution, followed by a heat treatment at 450° C. for 1 hour.

Figure 13:
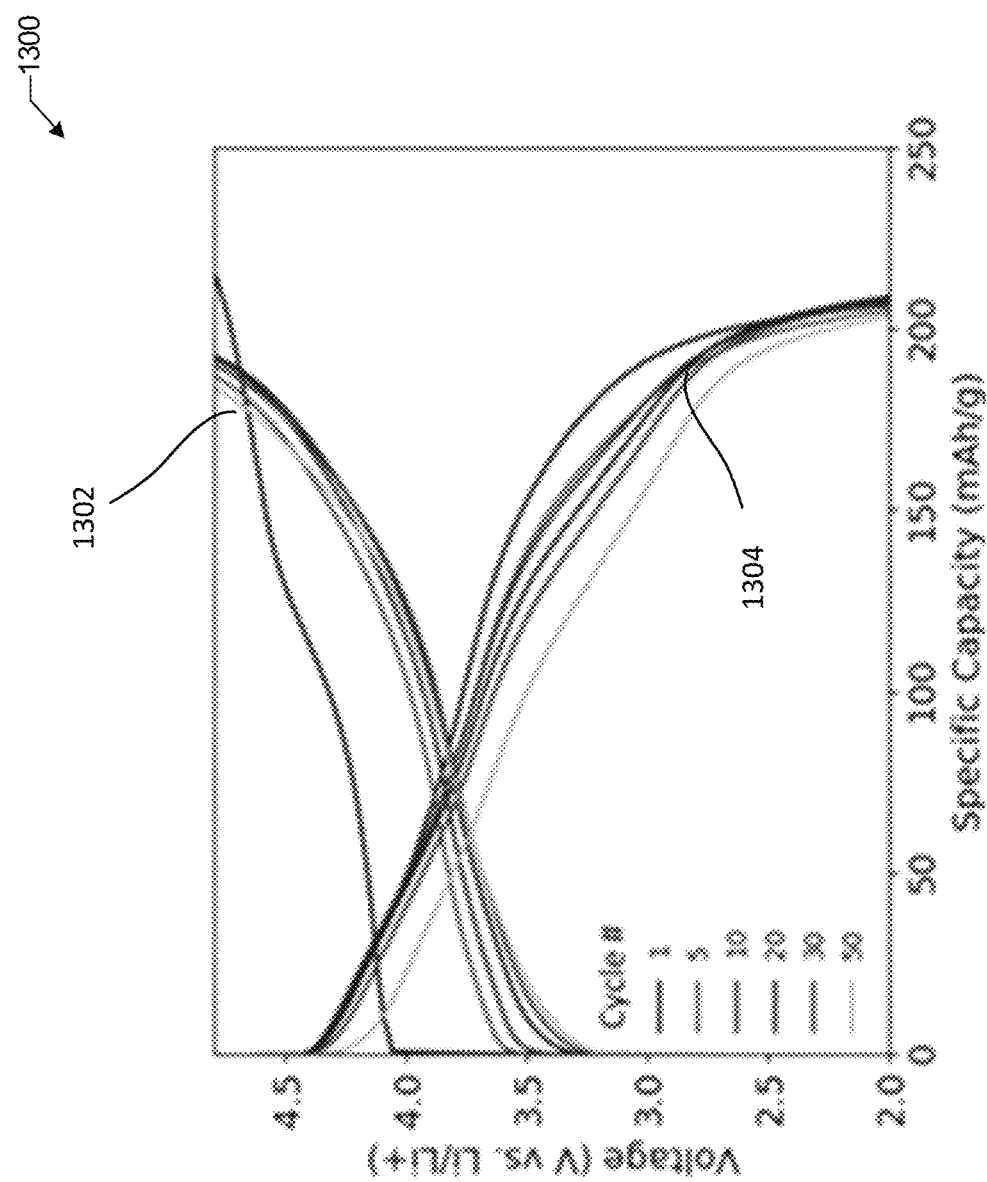
FIG. 13 is an example performance of charge-discharge profiles of $Al_2O_3$-coated single crystalline lithium nickel cobalt manganese oxide cathode material ($Li_{1.3}Ni_{0.2}Co_{0.2}Mn_{0.6}O_{2.3}$) synthesized by a hydrothermal process at different cycle numbers, in accordance with aspects of the present disclosure.

In one example, $Al_2O_3$ atomic layer deposition coating may be formed using an atomic layer deposition coating incorporated into either after drying or after heat treatment process. In this example, the atomic layer deposition coating may be applied to after heat treatment process. $Li_{1.3}Ni_{0.2}Co_{0.2}Mn_{0.6}O_{2.3}$ cathode active material may be transferred to a reactor and vacuumed down. Trimethyl aluminum may be injected at 85° C. into the reactor and held for 10 minutes, followed by purged with $N_2$ and vacuumed down. Subsequently, water may be injected into the reactor at 85° C. into the reactor and held for 10 minutes, followed by purged with $N_2$. This process may be repeated for 10 cycles. FIG. 13 shows an example performance of charge-discharge profiles 1300 of $Al_2O_3$-coated single crystalline lithium nickel cobalt manganese oxide cathode material ($Li_{1.3}Ni_{0.2}Co_{0.2}Mn_{0.6}O_{2.3}$) synthesized by a hydrothermal process at different cycle numbers. FIG. 13 shows a plurality of charging curves 1302 and a plurality of discharging curves 1304 at a range of cycles from 1 to 50 for the single crystalline lithium nickel cobalt manganese oxide cathode material ($Li_{1.3}Ni_{0.2}Co_{0.2}Mn_{0.6}O_{2.3}$) synthesized by the hydrothermal process.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the present disclosure. For example, the steps may be combined, modified, or deleted where appropriate, and additional steps may be added. Additionally, the steps may be performed in any suitable order without departing from the scope of the present disclosure.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims. Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are each defined herein to mean one or more than one of the elements that it introduces.

A number of examples have been described. Nevertheless, it will be understood that various modifications may be made. Accordingly, other implementations are within the scope of the following claims.

In the foregoing specification, embodiments of the disclosure have been described with reference to numerous specific details that may vary from implementation to implementation. Accordingly, the specification and drawings are to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method for making a coated single crystalline cathode active material in an aqueous solution comprising:
   preheating a metal solution, a lithium solution, and a coating solution;

generating a first mixture aqueous solution by mixing the metal solution and the lithium solution at below a critical point of the first mixture;

generating a second mixture aqueous solution by mixing the first mixture aqueous solution and the coating solution above a critical point of the second mixture aqueous solution to synthesize the coated single crystalline cathode active material in an aqueous solution; and filtering out the coated single crystalline cathode active material from the aqueous solution.

2. The method of claim 1, wherein the coated single crystalline cathode active material comprises:
a deagglomerated single crystalline particle comprising layered lithium nickel manganese oxide;
a metal oxide coating in contact with the layered lithium nickel manganese oxide; and
a carbon coating deposited over the metal oxide coating, the carbon coating being in contact with the metal oxide coating.

3. The method of claim 2, wherein:
the deagglomerated single crystalline particle comprises a stand-alone crystalline particle with no secondary particles or conglomerates.

4. The method of claim 2, wherein the layered lithium nickel manganese oxide comprises:
a layered crystal structure comprising R-3m crystal structure including lithium rich layers; and
$Li_{1+a}Ni_xMn_{1-x}D_yO_{2+b}$, wherein $0.0<a<0.5$, $0.0<x<=0.9$, $0.0<y<=0.1$, $0.0<b<0.5$, and D is a dopant.

5. The method of claim 4, wherein:
the dopant is selected from the group consisting of: sodium, potassium, crystal water, aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, and any combination thereof.

6. The method of claim 2, wherein:
the metal oxide coating is selected from the group consisting of: an aluminum oxide, a titanium oxide, a cobalt oxide, a nickel oxide, a copper oxide, a silicon oxide, a germanium oxide, a selenium oxide, a zirconium oxide, a niobium oxide, a tungsten oxide, a gallium oxide, a lithium oxide, a magnesium oxide, a strontium oxide, a barium oxide, an iron oxide, a hafnium oxide, a ruthenium oxide, a tantalum oxide, a vanadium oxide, an yttrium oxide, a manganese oxide, and any combination thereof, and
the metal oxide coating has a thickness of from about 0.1 nm to about 1 μm.

7. The method of claim 2, wherein:
the carbon coating is selected from the group consisting of: amorphous carbon, carbon black, acetylene black, ketjen black, conductive carbon, polymer carbon residue, conductive graphite, natural graphite, artificial graphite, expandable graphite, synthetic graphite, a graphite oxide, a graphene oxide, crumpled graphene, a single graphene layer, at least two graphene layers, at least three graphene layers, a multi-walled carbon nanotube, a single-walled carbon nanotube, carbon fiber, and any combination thereof, and
the carbon coating has a thickness of from about 0.1 nm to about 1 μm.

8. The method of claim 1, wherein:
the metal solution is a solution comprising a metal source selected from the group consisting of: a carbonate, a hydroxide, a chloride, an oxide, a fluoride, a sulfate, a nitrate, an acetate, and any combination thereof, wherein a metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof.

9. The method of claim 1, wherein:
the lithium solution is a solution comprising a lithium source selected from the group consisting of: a carbonate, a hydroxide, a chloride, an oxide, a fluoride, a sulfate, a nitrate, an acetate, and any combination thereof.

10. The method of claim 1, wherein:
the lithium solution comprises at least one of a sodium compound, a potassium compound, or any combination thereof, wherein the sodium compound is selected from the group consisting of: a carbonate, a hydroxide, a chloride, an oxide, a fluoride, a sulfate, a nitrate, an acetate, and any combination thereof, and wherein the potassium compound is selected from the group consisting of: a carbonate, a hydroxide, a chloride, an oxide, a fluoride, a sulfate, a nitrate, an acetate, and any combination thereof.

11. The method of claim 1, wherein:
the coating solution comprises at least one of a carbonaceous material, a carbon-containing polymer material, a metal source, or any combination thereof.

12. The method of claim 11, wherein:
the carbonaceous material is selected from the group consisting of: amorphous carbon, carbon black, acetylene black, ketjen black, conductive carbon, polymer carbon residue, conductive graphite, natural graphite, artificial graphite, expandable graphite, synthetic graphite, a graphite oxide, a graphene oxide, crumpled graphene, a single graphene layer, at least two graphene layers, at least three graphene layers, a multi-walled carbon nanotube, a single-walled carbon nanotube, carbon fiber, and any combination thereof.

13. The method of claim 11, wherein:
the carbon-containing polymer material is selected from the group consisting of: polypyrrole, polyaniline, poly (3,4-ethylenedioxythiophene), polyvinylidene fluoride, polytetrafluoroethylene, polyethylene oxides, ethyl cellulose, nitrocellulose, sucrose, glucose, carboxymethyl cellulose, and any combination thereof.

14. The method of claim 11, wherein:
the metal source is selected from the group consisting of a carbonate, a hydroxide, a chloride, an oxide, a fluoride, a sulfate, a nitrate, an acetate, and any combination thereof, wherein a metal in the metal source is selected from the group consisting of: aluminum, titanium, cobalt, nickel, copper, silicon, germanium, selenium, zirconium, niobium, tungsten, gallium, magnesium, strontium, barium, iron, hafnium, ruthenium, tantalum, vanadium, yttrium, manganese, sodium, potassium, lithium, and any combination thereof.

15. The method of claim 1, wherein:
at least one of the metal solution, the lithium solution, or the coating solution comprises an additive chemical selected from the group consisting of: citric acid, phosphoric acid, acetic acid, oxalic acid, ammonium hydroxide, hydrogen peroxide, sulfuric acid, cholic acid, ethanol, isopropyl alcohol, acetone, acetonitrile, hexane, cyclo-hexane, and any combination thereof.

16. The method of claim 1, wherein:
the one or more preheating and mixing steps utilize waste heat resources from a heat exchanger and renewable energy resources to heat a process fluid, and the one or more renewable energy resources comprise solar, geothermal, wind energy, or any combination thereof.

17. The method of claim 1, further comprising:
applying a wastewater treatment to concentrate and collect remaining one or more metal elements in a reactor effluent for re-utilization, and produce purified water for re-utilization, wherein the one or more metal elements comprise lithium.

18. The method of claim 1, wherein the preheating of the metal solution, the lithium solution, and the coating solution is performed at a temperature between 20° C. and 350° C., and a pressure between 1 bar and 150 bar.

19. The method of claim 1, wherein the mixing of the metal solution and the lithium solution is performed at a temperature between 20° C. and 500° C., and a pressure between 1 bar and 250 bar in an inert environment.

20. The method of claim 1, wherein the mixing of the first mixture and the coating solution is performed at a temperature between 350° C. and 500° C., and a pressure between 150 bar and 250 bar.

* * * * *